(12) United States Patent
Takebe et al.

(10) Patent No.: US 10,093,777 B2
(45) Date of Patent: Oct. 9, 2018

(54) FIBER-REINFORCED RESIN SHEET, INTEGRATED MOLDED PRODUCT AND PROCESS FOR PRODUCING SAME

(71) Applicant: TORAY Industries, Inc., Tokyo (JP)

(72) Inventors: Yoshiki Takebe, Iyo-gun (JP); Hiroki Kihara, Nagoya (JP); Noriyuki Hirano, Iyo-gun (JP)

(73) Assignee: TORAY INDUSTRIES, INC., Tokyo (JP)

( * ) Notice: Subject to any disclaimer, the term of this patent is extended or adjusted under 35 U.S.C. 154(b) by 380 days.

(21) Appl. No.: 14/442,764

(22) PCT Filed: Dec. 6, 2013

(86) PCT No.: PCT/JP2013/082762
§ 371 (c)(1),
(2) Date: May 14, 2015

(87) PCT Pub. No.: WO2014/103658
PCT Pub. Date: Jul. 3, 2014

(65) Prior Publication Data
US 2015/0376353 A1    Dec. 31, 2015

(30) Foreign Application Priority Data

Dec. 26, 2012 (JP) .................................. 2012-282880
Mar. 6, 2013 (JP) .................................. 2013-044003

(51) Int. Cl.
*C08J 5/04* (2006.01)
*C08K 7/06* (2006.01)
(Continued)

(52) U.S. Cl.
CPC .............. *C08J 5/042* (2013.01); *B29C 43/18* (2013.01); *B29C 43/305* (2013.01);
(Continued)

(58) Field of Classification Search
CPC ...... C08J 5/04; C08J 5/042; C08J 5/24; B32B 5/022; B32B 27/12; B32B 27/34;
(Continued)

(56) References Cited

U.S. PATENT DOCUMENTS

| 5,854,149 A | 12/1998 | Nagayama et al. |
| 2006/0110599 A1 | 5/2006 | Honma et al. |
| 2009/0208721 A1 | 8/2009 | Tsuchiya et al. |

FOREIGN PATENT DOCUMENTS

| EP | 2982504 A1 | 2/2016 |
| JP | 63-82743 A | 4/1988 |

(Continued)

OTHER PUBLICATIONS

Translation of JPH0815736 (which is a translation for JPS6480520); published Feb. 21, 1996.*

(Continued)

*Primary Examiner* — Catherine A. Simone
(74) *Attorney, Agent, or Firm* — Birch, Stewart, Kolasch & Birch LLP

(57) ABSTRACT

A fiber-reinforced resin sheet and an integrally molded article are provided. The fiber-reinforced resin sheet comprises a nonwoven fabric made of reinforcing fibers having a thermoplastic resin (A) impregnated on one side of the nonwoven fabric. The fiber-reinforced resin sheet satisfies any one of the following conditions (I) and (II):

(I) the nonwoven fabric has an area wherein the reinforcing fibers constituting the nonwoven fabric are exposed on the other side in the thickness direction of the nonwoven fabric, and (II) the nonwoven fabric has a thermoplastic resin (B) impregnated on the other side in thickness direction of the nonwoven fabric, and the nonwoven fabric has a reinforcing fiber volume ratio Vfm of up to 20% by volume, and wherein the thermoplastic resin (A) and (Continued)

the thermoplastic resin (B) form an interface layer in the sheet, and the interface layer has a concave-convex shape with a maximum height Ry of at least 50 μm and an average roughness Rz of at least 30 μm.

17 Claims, 7 Drawing Sheets

(51) Int. Cl.
| | |
|---|---|
| *B29C 70/02* | (2006.01) |
| *B29C 45/00* | (2006.01) |
| *B29C 45/14* | (2006.01) |
| *C08J 5/24* | (2006.01) |
| *B29C 43/30* | (2006.01) |
| *B32B 5/02* | (2006.01) |
| *B32B 27/12* | (2006.01) |
| *B32B 27/34* | (2006.01) |
| *B32B 27/36* | (2006.01) |
| *B29C 43/18* | (2006.01) |
| *B29C 70/34* | (2006.01) |
| *B29L 31/34* | (2006.01) |
| *B29K 105/12* | (2006.01) |
| *B29K 101/12* | (2006.01) |
| *B29K 307/04* | (2006.01) |

(52) U.S. Cl.
CPC .... *B29C 45/0005* (2013.01); *B29C 45/14786* (2013.01); *B29C 70/021* (2013.01); *B29C 70/345* (2013.01); *B32B 5/022* (2013.01); *B32B 27/12* (2013.01); *B32B 27/34* (2013.01); *B32B 27/365* (2013.01); *C08J 5/04* (2013.01); *C08J 5/24* (2013.01); *C08K 7/06* (2013.01); *B29C 45/14311* (2013.01); *B29K 2101/12* (2013.01); *B29K 2105/12* (2013.01); *B29K 2307/04* (2013.01); *B29L 2031/3481* (2013.01); *B32B 2260/023* (2013.01); *B32B 2260/046* (2013.01); *B32B 2307/538* (2013.01); *B32B 2307/542* (2013.01); *B32B 2605/00* (2013.01); *B32B 2605/003* (2013.01); *C08J 2300/22* (2013.01); *C08J 2323/12* (2013.01); *C08J 2369/00* (2013.01); *C08J 2371/12* (2013.01); *C08J 2377/02* (2013.01); *C08J 2377/06* (2013.01); *C08J 2381/04* (2013.01)

(58) Field of Classification Search
CPC .............. B32B 27/365; B29C 45/0005; B29C 2045/0006; B29C 2045/008; B29C 70/021
USPC ......... 428/297.4, 298.4, 297.7, 299.1, 299.4, 428/299.7, 300.7
See application file for complete search history.

(56) References Cited

FOREIGN PATENT DOCUMENTS

| | | | |
|---|---|---|---|
| JP | 64-80520 | A | 3/1989 |
| JP | 4-226346 | A | 8/1992 |
| JP | 6-262731 | A | 9/1994 |
| JP | 6-320655 | A | 11/1994 |
| JP | 8-224793 | A | 9/1996 |
| JP | 8-230114 | A | 9/1996 |
| JP | 9-38968 | A | 2/1997 |
| JP | 2002-104091 | A | 4/2002 |
| JP | 2003-136553 | A | 5/2003 |
| JP | 2006-205436 | A | 8/2006 |
| JP | 2007-502733 | A | 2/2007 |
| JP | 3906319 | B2 | 4/2007 |
| JP | 4023515 | B2 | 12/2007 |
| JP | 2008-49702 | A | 3/2008 |
| JP | 2008-50598 | A | 3/2008 |
| JP | 2008-230238 | A | 10/2008 |
| JP | 2010-253937 | A | 11/2010 |
| JP | 2012-152982 | A | 8/2012 |
| JP | 2014-19780 | A | 2/2014 |
| WO | WO 2004/110753 | A1 | 12/2004 |
| WO | WO 2006/041771 | A1 | 4/2006 |
| WO | WO 2012/101192 | A1 | 8/2012 |

OTHER PUBLICATIONS

Extended European Search Report for European Application No. 13868075.6, dated Jul. 26, 2016.
International Preliminary Report on Patentability and Written Opinion of the International Searching Authority (Forms PCT/IB/373, and PCT/ISA/237) for International Application No. PCT/JP2013/082762, dated Jun. 30, 2015.
Chinese Office Action, dated Nov. 4, 2016, for Chinese Application No. 201380059276.0, as well as an English translation.
International Search Report, issued in PCT/JP2013/082762, dated Mar. 18, 2014.

* cited by examiner

FIBER-REINFORCED RESIN SHEET, INTEGRATED MOLDED PRODUCT AND PROCESS FOR PRODUCING SAME

TECHNICAL FIELD

This invention relates to a fiber-reinforced resin sheet, an integrally molded article, and their production method.

BACKGROUND ART

Fiber reinforced plastics (FRP) comprising a reinforcing fiber and a matrix resin are widely used in various industrial applications because of their light weight and excellent mechanical properties. Of the FRP, the FRP prepared by using a thermoplastic resin have recently come into the spotlight due to their feasibility of mass production by high speed molding and their recyclability in addition to their light weight and mechanical properties.

Components and structures using an FRP is generally produced by integrating a plurality of members or materials and a step of joining such members or materials is involved in the production of such components or structures. Exemplary known method used for the joining include mechanical joining using bolt, rivet, screw, or the like and the joining using an adhesive. The mechanical joining may suffer from the increased cost due to the processing using joint part, increased weight due to the use of the bolt and the like, brittleness due to concentration of the stress to the processed part, and the like despite its wide applicability. The joining using an adhesive may suffer from the need of the additional step of coating the adhesive, the fact that the limit of the joining strength depends on the strength of the adhesive, insufficient reliability of the joint, and the like.

In the meanwhile, a known method which can be uniquely used in the case of the FRP prepared by using a thermoplastic resin is welding. Since the thermoplastic resin has the nature that it melts by heating and a high-cycle joining at a low cost is possible by using such nature, active technology development on the melt joining is under way. However, such melt joining cannot be conducted in the case of the mutually incompatible thermoplastic resins, and such mutually incompatible thermoplastic resins suffered from the problem of frequent peeling at the interface. In view of such situation, there have been disclosed techniques where a minute anchoring structure is formed at the interface between a FRP prepared by using another thermosetting resin and another FRP prepared by using a thermoplastic resin to thereby improve the bonding between the different resins, and also disclosed are inventions wherein strength of the adhesive layer is defined (Patent Documents 1, 2, 3, 4, 10, and 11). The techniques disclosed in these Patent Documents require use of a thermosetting resin having a low viscosity. In addition, in the techniques disclosed in these Patent Documents, a continuous fiber is used for the thermosetting resin, and molding of the articles having a complicated shape is impossible, and reprocessing was also impossible. Furthermore, adhesion realized by such minute anchoring structure described in these Patent Documents was insufficient for joining mutually incompatible thermoplastic resins.

In the meanwhile, Patent Document 5 discloses a technique wherein a base material comprising a thermoplastic resin and a surface material comprising another thermoplastic resin are integrated by melting. The technique disclosed in Patent Document 5 does not use the reinforcing fiber and the resulting molded article had low strength.

Patent Documents 6 and 9 disclose an integrated composite material wherein a mat member comprising a reinforcing long fiber has different thermoplastic resins impregnated on opposite sides. These Patent Documents are silent about the type of the reinforcing fibers and their dispersion states Patent Document 8 discloses a technique wherein adhesion with a thermosetting adhesive or cement is improved by preparing a composite substrate having a polyolefin resin impregnated on opposite sides. In this technique disclosed in the Patent Document, the thermoplastic resin used is limited to one type, and adhesion with many types of material using different thermoplastic resins is limited.

Patent Documents 12 and 13 disclose the technique of improving the adhesion between the resins by forming minute anchoring structure at the FRP interface in the sheet comprising the reinforcing fiber which has been opened to substantially single filament state and the resin. In this technique, the sheet is heated to a temperature not lower than the melting point of the resin to thereby raise the fiber that had been caught by the resin, namely to cause the spring back of the fiber in the porous sheet material to thereby form concave-convex shape on the surface. In the technique disclosed in these Patent Documents, the joining of the sheet materials are estimated to have been realized by the intrusion of the thermoplastic resin into the pores of the porous sheet materials. However, the shape and structure of the pores involved in the anchoring are not regulated, and further improvement in the joining properties is required if the growing market demand is to be satisfied. There has also been the problem that the minute anchoring structure described in these Patent Documents could not realize sufficient adhesion strength in the case of mutually incompatible thermoplastic resins.

PRIOR ART DOCUMENTS

Patent Documents

Patent Document 1: Japanese Unexamined Patent Publication (Kokai) No. 2008-230238
Patent Document 2: Japanese Unexamined Patent Publication (Kokai) No. 2008-50598
Patent Document 3: Japanese Unexamined Patent Publication (Kokai) No. 2008-49702
Patent Document 4: Japanese Unexamined Patent Publication (Kokai) No. 2006-205436
Patent Document 5: Japanese Unexamined Patent Publication (Kokai) No. 2003-136553
Patent Document 6: Japanese Unexamined Patent Publication (Kokai) No. H6-262731
Patent Document 7: Japanese Unexamined Patent Publication (Kokai) No. H4-226346
Patent Document 8: Japanese Unexamined Patent Publication (Kokai) No. S63-82743
Patent Document 9: WO 2006/041771
Patent Document 10: Japanese Patent No. 3906319
Patent Document 11: Japanese Patent No. 4023515
Patent Document 12: Japanese Unexamined Patent Publication (Kokai) No. 2002-104091
Patent Document 13: Japanese Unexamined Patent Publication (Kokai) No. H8-230114

SUMMARY OF THE INVENTION

Problems to be Solved by the Invention

In view of such situation, an object of the present invention is to solve the technical problems as described above, and provide a fiber-reinforced resin sheet which can be used in producing an integrally molded article enjoying firm joining between thermoplastic resins which are mutually incompatible, and which can be easily integrated with other thermoplastic resins. Another object of the present invention is to provide an integrally molded article produced by using such fiber-reinforced resin sheet.

Means for Solving the Problems

The present invention which intends to solve the problems as described above has any of the following constitution.

(1) A fiber-reinforced resin sheet comprising a nonwoven fabric made of reinforcing fibers having a thermoplastic resin (A) impregnated on one side in thickness direction of the nonwoven fabric, wherein the fiber-reinforced resin sheet satisfies any one of the following conditions (I) and (II):

(I) the nonwoven fabric has an area wherein the reinforcing fibers constituting the nonwoven fabric are exposed on the other side in the thickness direction of the nonwoven fabric, and (II) the nonwoven fabric has a thermoplastic resin (B) impregnated on the other side in thickness direction of the nonwoven fabric, and the nonwoven fabric has a reinforcing fiber volume ratio V in of up to 20% by volume, and wherein the thermoplastic resin (A) and the thermoplastic resin (B) form an interface layer in the sheet, and the interface layer has a concave-convex shape with a maximum height Ry of at least 50 μm and an average roughness Rz of at least 30 μm.

(2) A fiber-reinforced resin sheet according to (1) comprising a nonwoven fabric made of reinforcing fibers having a thermoplastic resin (A) impregnated on one side in thickness direction of the nonwoven fabric, wherein the resin sheet satisfies the condition (I).

(3) A fiber-reinforced resin sheet according to (2) wherein the area where the reinforcing fibers are exposed has a reinforcing fiber volume ratio Vfm of up to 20% by volume.

(4) A fiber-reinforced resin sheet according to (1) comprising a nonwoven fabric made of reinforcing fibers having a thermoplastic resin (A) impregnated on one side in thickness direction of the nonwoven fabric, wherein the resin sheet satisfies the condition (II).

(5) A fiber-reinforced resin sheet according to (4) wherein usable temperature range of the thermoplastic resin (A) and usable temperature range of the thermoplastic resin (B) overlap with each other with the overlapping temperature range of at least 5° C.

(6) A fiber-reinforced resin sheet according to any one of (1) to (5) wherein discontinuous reinforcing fibers are dispersed in substantially monofilament state in the nonwoven fabric.

(7) A fiber-reinforced resin sheet according to any one of (1) to (6) wherein anti-plane angle θz of the reinforcing fiber in the sheet is at least 5°.

(8) A fiber-reinforced resin sheet according to any one of (1) to (7) wherein the reinforcing fiber constituting the nonwoven fabric is carbon fiber.

(9) An integrally molded article comprising a first member constituted from the fiber-reinforced resin sheet according to (2) or (3) and a second member which is a different molded article comprising a thermoplastic resin (B) joined to the first member by impregnation of the thermoplastic resin (B) into the area where the reinforcing fibers are exposed in the fiber-reinforced resin sheet.

(10) An integrally molded article comprising a first member which is the fiber-reinforced resin sheet according to (4) or (5) or a molded article containing the fiber-reinforced resin sheet and a second member joined to the first member which is a different molded article.

(11) An integrally molded article according to (9) or (10) wherein the thermoplastic resin (A) and the thermoplastic resin (B) forms an interface layer having a concave-convex shape with a maximum height Ry of at least 50 μm and an average roughness Rz of at least 30 μm.

(12) An integrally molded article comprising a nonwoven fabric made of reinforcing fibers having a thermoplastic resin (A) and a thermoplastic resin (B) impregnated therein wherein the thermoplastic resin (A) and the thermoplastic resin (B) forms an interface layer having a concave-convex shape with a maximum height Ry of at least 50 μm and an average roughness Rz of at least 30 μm.

(13) A method for producing an integrally molded article according to any one of (9) to (11) wherein the second member is a molded article prepared by injection molding, and the second member is joined to the first member by insert injection molding or outsert injection molding.

(14) A method for producing an integrally molded article according to any one of (9) to (11) wherein the second member is a molded article prepared by press molding, and the second member is joined to the first member by press molding.

(15) An integrally molded article according to any one of (9) to (12) wherein the article is used for automobile interior or exterior material, housing of electric or electronic equipment, structural member of a bicycle or sport equipment, aircraft interior finishing material, or transportation package.

Advantageous Effect of the Invention

Use of the fiber-reinforced resin sheet of the present invention enables production of an integrally molded article which enjoy strong joining strength without using the joining medium such as fastener or adhesive even in the case of joining thermoplastic resins whose joining has been difficult, and in particular, in the case of joining different resins. Such integrally molded article may include hybrid structures formed from different thermoplastic resin molding materials, and the molded article will have added values thanks to the functions realized by the properties of the different resins. Such integrally molded article of the present invention also exhibits excellent productivity since the article has a surface that can be used in the melt adhesion with other components, and this function is preferable in the implementation of such article in automobile components, housing of electric and electronic equipment, aircraft components, and other applications.

DESCRIPTION OF PREFERRED EMBODIMENTS

The fiber-reinforced resin sheet of the present invention contains a nonwoven fabric constituted from reinforcing fibers (the nonwoven fabric constituted from reinforcing fibers hereinafter also referred to as the reinforcing fiber nonwoven fabric) as its constituent. The nonwoven fabric as used herein is a sheet-form article constituted from fibers, the reinforcing fiber nonwoven fabric is a type of reinforcing fiber mat. The reinforcing fiber nonwoven fabric may also contain a powder- or fiber-form resin component in addition to the reinforcing fibers.

The fiber-reinforced resin sheet of the present invention comprises a nonwoven fabric made of reinforcing fibers, and the nonwoven fabric is impregnated with a thermoplastic resin (A) on one side in thickness direction of the nonwoven fabric. The fiber-reinforced resin sheet satisfies any one of the following conditions:

(I) the nonwoven fabric has an area wherein the reinforcing fibers constituting the nonwoven fabric are exposed on the other side in the thickness direction of the nonwoven fabric, and (II) the nonwoven fabric has a thermoplastic resin (B) impregnated on the other side in thickness direction of the nonwoven fabric, and the nonwoven fabric has a reinforcing fiber volume ratio Vfm of up to 20% by volume, and wherein the thermoplastic resin (A) and the thermoplastic resin (B) form an interface layer in the sheet, and the interface layer has a concave-convex shape with a maximum height Ry of at least 50 μm and an average roughness Rz of at least 30 μm.

Figure 1:
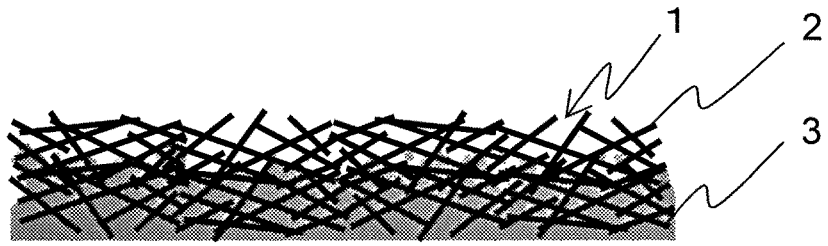
FIG. 1 is a schematic view showing an exemplary cross-sectional view of the fiber-reinforced resin sheet of the present invention satisfying the condition (I).

The condition (I) is described in further detail. FIG. 1 shows an embodiment of the fiber-reinforced resin sheet satisfying the condition (I) of the present invention. The reinforcing fiber is "exposed" when the reinforcing fiber is not impregnated with the thermoplastic resin (reinforcing fiber 2 in FIG. 1). In other words, the reinforcing fiber is "exposed" when the reinforcing fiber constituting the nonwoven fabric protrudes out of the layer impregnated with the thermoplastic resin (A) (3 in FIG. 1) in the substantially same state. The area having exposed reinforcing fibers is the space where the exposed reinforcing fibers are present. When a molding component comprising the thermoplastic resin (B) which is different from the thermoplastic resin (A) is in molten state enters the voids formed between the reinforcing fibers in the area having exposed reinforcing fibers for joining, an interface layer wherein the thermoplastic resin (A) and thermoplastic resin (B) are anchored by the intervening exposed reinforcing fiber, and the area having exposed reinforcing fibers fulfills the function of impregnation medium. In addition, the nonwoven fabric structure of the reinforcing fiber of the present invention facilitates smooth impregnation of the thermoplastic resin which generally tends to have a high viscosity.

Figure 2:
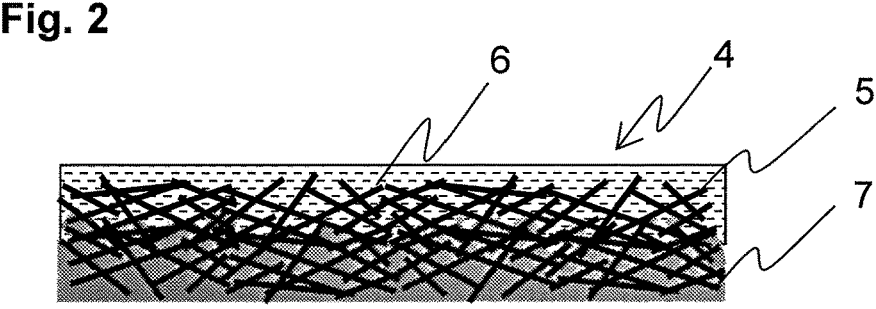
FIG. 2 is a schematic view showing an exemplary cross-sectional view of the fiber-reinforced resin sheet of the present invention satisfying the condition (II).

Next, the condition (II) is described in further detail. In the condition (II), the nonwoven fabric is also impregnated with the thermoplastic resin (B) on the side different in the thickness direction from the side impregnated with the thermoplastic resin (A). FIG. 2 shows the reinforcing fiber nonwoven fabric (reinforcing fiber 5 in FIG. 2) having different thermoplastic resins (thermoplastic resin (A) 7 and thermoplastic resin (B) 6 in FIG. 2) impregnated therein. More specifically, the reinforcing fibers constituting the nonwoven fabric are impregnated with the thermoplastic resin (A) and the thermoplastic resin (B) in the substantially same state, thereby forming an interface layer.

In the condition (II), in view of the joining strength between the thermoplastic resin (A) and the thermoplastic resin (B), the reinforcing fiber nonwoven fabric should have a reinforcing fiber volume ratio Vfm of up to 20% by volume, and the thermoplastic resin (A) and the thermoplastic resin (B) should form an interface layer having a concave-convex shape with a maximum height Ry of at least 50 μm and an average roughness Rz of at least 30 μm. FIG. 2 shows an embodiment of the fiber-reinforced resin sheet satisfying the condition (II) of the present invention.

In the condition (II), the reinforcing fiber nonwoven fabric fulfills the function of an impregnation medium for the formation of the interface layer where the thermoplastic resin (A) and the thermoplastic resin (B) form mutually anchored structure. Many thermoplastic resins are highly viscous, and their viscosity is often several times to several thousand times higher than the thermosetting resin. Accordingly, the reinforcing fiber nonwoven fabric should have a structure which facilitates the impregnation of the thermoplastic resin under the condition (II), and the volume ratio of the reinforcing fiber Vfm in the nonwoven fabric should be up to 20% by volume.

The reinforcing fiber volume ratio Vfm of the nonwoven fabric is the content by volume of the reinforcing fiber per unit volume of the nonwoven fabric. When the reinforcing fiber volume ratio Vfm of the nonwoven fabric is within such range, abundant void will be left in the nonwoven fabric to allow formation of the flow path of the thermoplastic resin in the impregnation, and smooth impregnation of the thermoplastic resin will be facilitated. The molded article or the integrally molded article will then be provided with excellent mechanical properties as well as reliability. In addition, complicated flow path will be formed in the nonwoven fabric and this will results in the complicated impregnation of the thermoplastic resin, and formation of anchoring structure with concave-convex shape of the thermoplastic resin (A) and the thermoplastic resin (B) will be promoted in the interface layer. As a consequence, the resulting fiber-reinforced resin sheet will exhibit firm join between the different resins and the resulting molded article or the integrally molded article will enjoy a high joining strength.

On the other hand, when the reinforcing fiber volume ratio Vfm in the nonwoven fabric is in excess of 20% by volume, the impregnation of the thermoplastic resin will be difficult. This in turn will require application of a high pressure for the impregnation, selection of a resin having a low viscosity, and the like, and the means used for the impregnation and the selection of the resin species will be greatly limited. Use of a high impregnation pressure is particularly problematic since use of such high impregnation pressure may disturb alignment of the reinforcing fiber and this may invite failure in the formation of the fiber-reinforced resin sheet having the desired structure. The excessively high reinforcing fiber volume ratio Vfm may also result in the formation of the unimpregnated area in the sheet which may adversely affect the mechanical properties and the reliability of the molded article or the integrally molded article.

The reinforcing fiber volume ratio Vfm of the nonwoven fabric is preferably up to 15% by volume, and more preferably up to 10% by volume. While there is no particular lower limit for the reinforcing fiber volume ratio Vfm of the nonwoven fabric, the reinforcing fiber volume ratio Vfm is preferably approximately 3% by volume in consideration of practical matters such as handling convenience of the nonwoven fabric and molding feasibility in the fiber-reinforced resin sheet formation.

In the condition (I), the volume ratio Vfm1 of the reinforcing fiber in the area having exposed reinforcing fibers is preferably up to 20% by volume in view of the joining strength in the joining with other molding material and handling convenience of the fiber-reinforced resin sheet. The volume ratio Vfm1 is the content by volume of the reinforcing fiber per unit volume of the area having exposed reinforcing fibers (a partial area in the nonwoven fabric). When the reinforcing fiber volume ratio Vfm1 is within such range, abundant void will be left in the area having exposed reinforcing fibers to allow formation of the flow path for the impregnation of the thermoplastic resin (B) constituting the molding material which is to be joined in the preparation of the integrally molded article, and smooth impregnation of such thermoplastic resin will be facilitated. In addition, complicated flow path will be formed between the reinforcing fibers in the area having exposed reinforcing fibers and formation of the anchoring structure enabled by the exposed reinforcing fibers will be promoted in the interface layer of the thermoplastic resins. As a consequence, the resulting integrally molded article will be provided with excellent mechanical properties as well as reliability, and since strong joining is enabled between the different thermoplastic resins, a high joining strength will be realized between the first member and the second member after the preparation of the integrally molded article. In addition, in the condition (I), the reinforcing fiber volume ratio Vfm of the nonwoven fabric is preferably similar to the range described for the condition (II).

On the other hand, when the volume ratio Vfm1 as described above is in excess of 20% by volume as in the condition (I), the impregnation of the thermoplastic resin (B) in the joining will be difficult. This in turn will require application of a high pressure for the impregnation, selection of a resin having a low viscosity, and the like, and the means used for the impregnation and the selection of the resin species will be greatly limited. Use of a high impregnation pressure is particularly problematic since use of such high impregnation pressure may disturb alignment of the reinforcing fiber and this may invite failure in the formation of integrally molded article having the desired structure. The excessively high reinforcing fiber volume ratio Vfm1 may also result in the formation of unimpregnated areas in the impregnation of the thermoplastic resin (B) in the fiber-reinforced resin sheet which may adversely affect the mechanical properties and the reliability of the integrally molded article.

The volume ratio Vfm1 as described above is more preferably up to 15% by volume, and preferably, the lower limit of the volume ratio Vfm1 is approximately 5% by volume in consideration of practical matters such as handling convenience of the reinforcing fiber nonwoven fabric and molding feasibility in the fiber-reinforced resin sheet formation.

The volume ratio Vfm as described above can be measured by using the reinforcing fiber nonwoven fabric for the test piece and measuring its weight and volume, and the volume ratio Vfm1 as described above can be measured by using the area having exposed reinforcing fibers in the reinforcing fiber nonwoven fabric for the test piece and measuring its weight and volume. The reinforcing fiber nonwoven fabric used for the test piece may be isolated from the fiber-reinforced resin sheet by sandwiching the fiber-reinforced resin sheet between two metal meshes and burning of the thermoplastic resin component to leave the nonwoven fabric, or by immersing the fiber-reinforced resin sheet sandwiched between two metal meshes in a solvent capable of dissolving the thermoplastic resin to thereby remove the resin component by dissolution and collect the residual nonwoven fabric. The area having exposed reinforcing fibers in the reinforcing fiber nonwoven fabric used for the test piece may be isolated by removing the part impregnated with the thermoplastic resin component from the fiber-reinforced resin sheet with a cutter knife, razor, or the like, and collecting the thus obtained nonwoven fabric part, namely, the area having exposed reinforcing fibers. The resulting test piece is evaluated for the weight Wm and the thickness tm. The thickness tm is the value measured according to "Method for measuring thickness of carbon fiber woven fabric" defined in JIS R7602 (1995), and more specifically, the value measured after applying 50 kPa for 20 seconds. If shape retention of the test piece is difficult, the measurement can be conducted by measuring the thickness with the metal meshes and subtracting the thickness of the metal meshes. The weight Wm of the test piece is the value measured according to "Method for measuring unit area weight of carbon fiber woven fabric carbon fiber" defined in JIS R7602 (1995). The value calculated from the area S and the thickness tm of the test piece is used for the volume of the test piece (the reinforcing fiber nonwoven fabric or the area having exposed reinforcing fibers). The volume ratio Vfm (% by volume) of the reinforcing fiber in the nonwoven fabric or the volume ratio Vfm1 (% by volume) of the reinforcing fiber in the area having exposed reinforcing fibers is calculated from the weight Wm and the thickness tm measured as described above by the following equations. In the equation, $\rho f$ is the density (g/cm$^3$) of the reinforcing fiber and S is the cut out area (cm$^2$) of the test piece (the reinforcing fiber nonwoven fabric or the area having exposed reinforcing fibers).

when the sample is the reinforcing fiber nonwoven fabric:

$$Vfm(\% \text{ by volume})=(Wm/\rho f)/(S \times tm) \times 100$$

when the sample is the area having exposed reinforcing fibers:

$$Vfm1(\% \text{ by volume})=(Wm/\rho f)/(S \times tm) \times 100$$

In the case of the condition (I), the nonwoven fabric used in the present invention also has the function of reinforcement material at the interface between the thermoplastic resin constituting the fiber-reinforced resin sheet, namely, the thermoplastic resin (A) and the thermoplastic resin constituting the other molding material, namely, the thermoplastic resin (B). In the case of the condition (II), the nonwoven fabric used in the present invention also has the function of reinforcement material at the interface between the thermoplastic resin (A) constituting the fiber-reinforced resin sheet and the thermoplastic resin (B). In the case of the condition (I), the fiber-reinforced resin sheet is constituted from the reinforcing fiber nonwoven fabric and the thermoplastic resin (A) impregnated in the nonwoven fabric, and the interface layer in the case of the condition (I) is the plane on the side of the area where the reinforcing fibers are exposed in the fiber-reinforced resin sheet, namely, the part which becomes the plane where the thermoplastic resin (A) in the fiber-reinforced resin sheet contacts the thermoplastic resin (B) constituting the other molding material when the integrally molded article is produced.

In the case of the nonwoven fabric having the volume ratio Vfm satisfying the range as described above, the nonwoven fabric has the bulkiness due to the steric hindrance of the reinforcing fiber, and the fiber is oriented in relation to the thickness direction of the nonwoven fabric. As a consequence, the interface layer extending in the in-plane direction of the fiber-reinforced resin sheet will be at certain angle with the reinforcing fiber, and the probability of the reinforcing fiber extending through the interface layer will be increased. This in turn means that fiber breakage and interfacial peeling will be effectively induced upon application of shear load, and the integrally molded article will exhibit strong join at the interface layer. On the other hand, when the volume ratio Vfm is outside the range as described above, the reinforcing fibers will be arranged in the direction substantially parallel to the in-plane direction which is the direction of the interface layer, and the reinforcing fibers will not be effectively utilized in the reinforcement and the shear strength of the interface layer may become insufficient In the embodiment wherein the function as described above is effectively realized, the reinforcing fiber in the fiber-reinforced resin sheet or the reinforcing fiber in the area having exposed reinforcing fibers of the fiber-reinforced resin sheet may preferably have an anti-plane angle $\theta z$ of at least 5°. The anti-plane angle $\theta z$ of the reinforcing fiber is the degree of inclination of the reinforcing fiber in relation to the thickness direction of the fiber-reinforced resin sheet or the area having exposed reinforcing fibers of the fiber-reinforced resin sheet. A larger value of the anti-plane angle $\theta z$ corresponds to the larger inclination of the reinforcement fiber approaching the thickness direction, and this anti-plane angle $\theta z$ is given in the range of 0 to 90°. In other words, when the anti-plane angle $\theta z$ of the reinforcing fiber is within such range, the reinforcement function in the interface layer as described above is more effectively realized, and the joining strength of the interface layer will be higher. Although no particular upper limit is set for the anti-plane angle $\theta z$ of the reinforcing fiber, the anti-plane angle $\theta z$ is preferably up to 15°, and more preferably up to 10° in view of the handling convenience of the resulting fiber-reinforced resin sheet.

Figure 3:
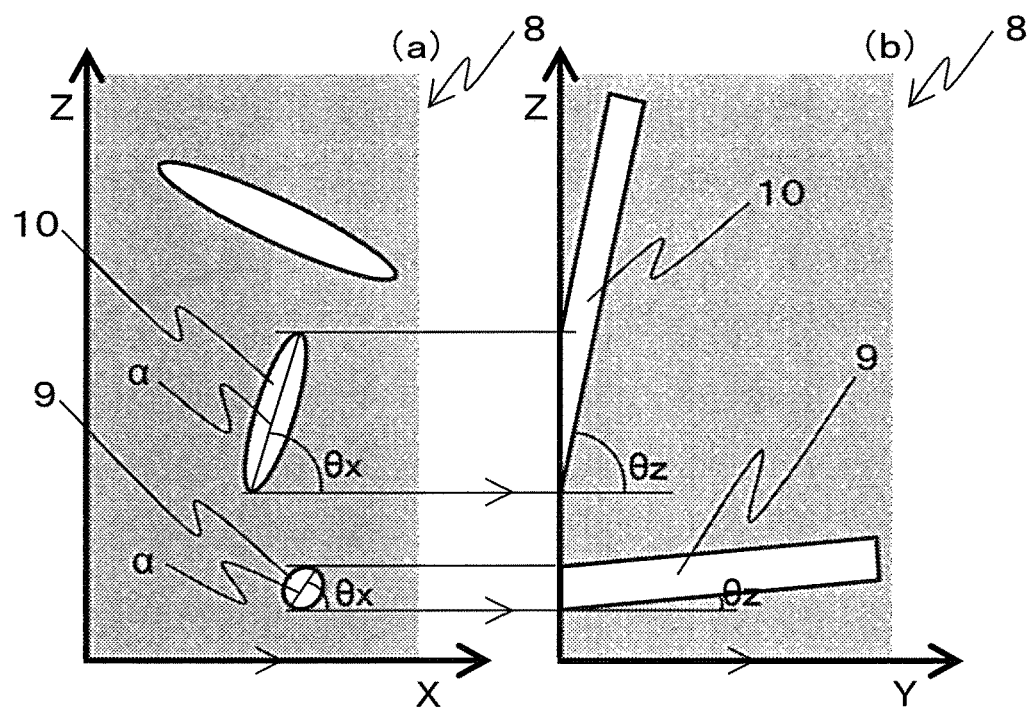
FIG. 3 is a schematic view showing an exemplary expanded cross-sectional view of the fiber-reinforced resin sheet of the present invention.

The anti-plane angle $\theta z$ of the reinforcing fiber may be measured by observing a cross section perpendicular to the plane direction of the fiber-reinforced resin sheet D. FIG. 3 shows a cross section (a) perpendicular to the plane direction of the reinforcing fiber in the fiber-reinforced resin sheet to be measured and its depth direction (b). In FIG. 3 (a), the cross sections of the reinforcing fibers 9 and 10 are approximated to ellipse shape for the convenience of the measurement. The cross section of the reinforcing fiber 9 has smaller aspect ratio of the ellipse (=major axis of the ellipse/minor axis of the ellipse) while the cross section of the reinforcing fiber 10 has a larger aspect ratio of the ellipse. In the meanwhile, in FIG. 3 (b), the reinforcing fiber 9 has an inclination which is substantially parallel to the depth direction Y while the reinforcing fiber 10 has a substantial inclination to the depth direction Y. In this case, the reinforcing fiber 10 at the cross section of the FIG. 3 (a) has an angle $\theta x$ defined between the plane direction X of the fiber-reinforced resin sheet and the major axis $\alpha$ of the fiber (direction of the major axis of the ellipse) which is substantially equal to the anti-plane angle of the reinforcing fiber. On the other hand, in the case of the reinforcing fiber 9, there is a large difference between the angle $\theta x$ and the angle indicated by the anti-plane angle $\theta z$, and it cannot be said that the angle $\theta x$ reflects the anti-plane angle $\theta z$. Accordingly, when the anti-plane angle $\theta z$ should be read from the cross section perpendicular to the plane direction of the fiber-reinforced resin sheet or the area having exposed reinforcing fibers of the fiber-reinforced resin sheet, the precision of the detection of the anti-plane angle $\theta z$ can be improved by extracting the fiber having an aspect ratio of the ellipse of the fiber cross section which is higher than the predetermined value.

In this case, the aspect ratio of the ellipse to be extracted may be used as described below. When the cross sectional shape of the single filament resembles true circle, namely, when the fiber aspect ratio in the cross section perpendicular to the longitudinal direction of the reinforcing fiber is up to 1.1, the procedure may be such that the angle between the X direction and the fiber major axis $\alpha$ is measured for the reinforcing fiber having an aspect ratio of the ellipse of at least 20, and this angle may be adopted for the anti-plane angle $\theta z$. In the meanwhile, when the shape of the cross section of the single filament is an ellipse, a dumbbell shape, or the like and the fiber aspect ratio is greater than 1.1, the anti-plane angle is preferably measured by focusing on the reinforcing fiber having a larger aspect ratio of the ellipse. When the fiber aspect ratio is at least 1.1 and less than 1.8, the anti-plane angle $\theta z$ may be measured by selecting the reinforcing fiber having an aspect ratio of the ellipse of at least 30. When the fiber aspect ratio is at least 1.8 and less than 2.5, the anti-plane angle $\theta z$ may be measured by selecting the reinforcing fiber having an aspect ratio of the ellipse of at least 40. When the fiber aspect ratio is at least 2.5, the anti-plane angle $\theta z$ may be measured by selecting the reinforcing fiber having an aspect ratio of the ellipse of at least 50.

In the present invention, the reinforcing fiber should contain a lot of voids in its assembly, and in order to satisfy such embodiment, the reinforcing fiber is in the form of nonwoven fabric. In addition, the reinforcing fiber constituting the nonwoven fabric is preferably in the form of discontinuous reinforcing fiber cut into predetermined length, and the reinforcing fiber is preferably a discontinuous reinforcing fiber also in view of readily adjusting the nonwoven fabric.

The nonwoven fabric has the form wherein the strand and/or the monofilament (the strand and the monofilament are hereinafter together referred to as the fine size strand) of the reinforcing fiber are dispersed in the shape of plane, and exemplary forms include chopped strand mat, continuous strand mat, paper-making mat, carding mat, air-laid mat, and the like. The strand is assembly of a plurality of single filaments aligned in parallel, and the strand is also called a fiber bundle. In the form of the nonwoven fabric, the dispersion of the fine size strand generally has no regularity. Such form of the nonwoven fabric has good shape imparting capability, and molding into complicated shape is thereby facilitated. In addition, the voids in the nonwoven fabric complicates the progress of the resin impregnation, and the thermoplastic resin (A) and the thermoplastic resin (B) constituting the other molding material will form more complicated interface when joined into the integrally molded article to thereby develop an excellent joining.

The nonwoven fabric is more preferably in the form of a nonwoven fabric wherein the discontinuous reinforcing fiber is dispersed in substantially monofilament state. The "substantially monofilament dispersion" means that the discontinuous reinforcing fiber constituting the nonwoven fabric contains at least 50% by weight of the fine size strand having the filament number of less than 100. When such discontinuous reinforcing fiber is dispersed in substantially monofilament state, steric hindrance between the reinforcing fibers is increased, and the anchoring structure between the reinforcing fiber and the thermoplastic resin will be more firm in the integrally molded article. In addition, small constitutional unit of the fine size strand contributes for the formation of complicated and compact fiber network structure, and the resulting minute voids results in the compact, deep, and complicated anchoring structure in the interface layer when produced into the integrally molded article. This leads to the firm joining by the interface layer in the integrally molded article. In the case of the fiber bundle with increased number of filaments, the ends often become the starting point of the fracture, and since the number of the starting point of the fracture reduces, the function as the reinforcing material is increased to become an interface layer with higher reinforcement efficiency and reliability. In such point of view, the discontinuous reinforcing fiber preferably contains at least 70% by weight of the fine size strand having the filament number of less than 100.

The filament state of the discontinuous reinforcing fiber of the nonwoven fabric may be measured by the method as described below. After sandwiching the fiber-reinforced resin sheet between the metal meshes and removing the thermoplastic resin component by burning, the residual nonwoven fabric was collected. The thus collected nonwoven fabric was evaluated for the weight Wm, and all visually recognized fiber bundles were extracted by forceps. All fiber bundles were measured for the length Ls at the precision of 1/100 mm and the weight Ws at a precision of 1/100 mg. From experience, the fiber bundle which can be visually extracted is those comprising about 50 filaments at most, and almost all fiber bundles are those in the range of 100 or more filaments, and the residual fiber bundles are those comprising up to 100 filaments. With regard to the calculation of the filament number, the fiber bundles that are found to have less than 100 filaments were excluded from the integration of the Ws. The filament number $F_i$ is calculated from the length $Ls_i$, and the weight $Ws_i$ of the fiber bundle extracted at i-th (i=1 to n) extraction by the following equation. The D in the equation is the fineness (mg/mm) of the filament.

$$F_i(\text{number}) = Ws_i/(D \times Ls_i)$$

Figure 4:
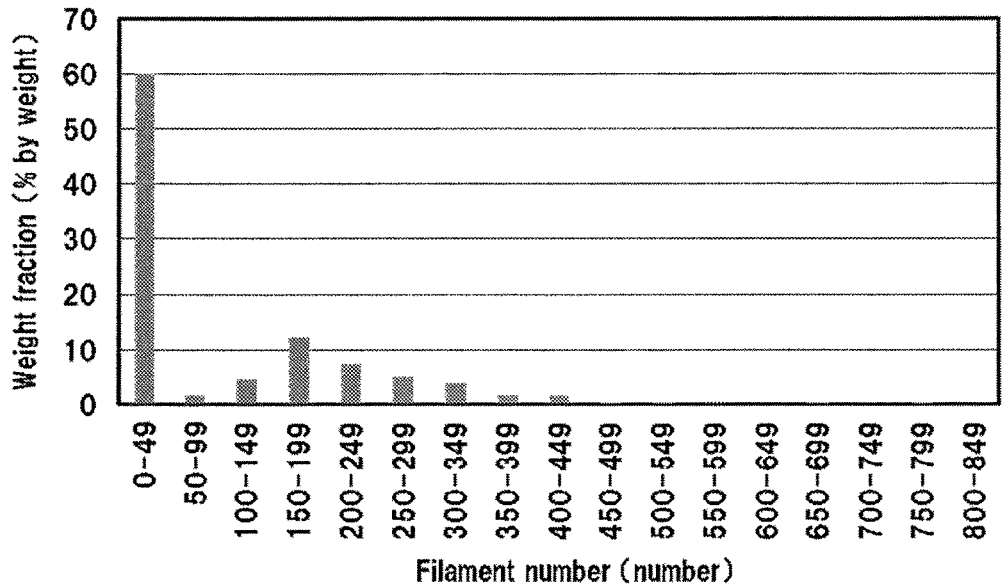
FIG. 4 is a graph showing weight distribution of the fiber bundles in the nonwoven fabric constituted from the reinforcing fibers used in the present invention.

Selection of the fiber bundles is conducted by the thus calculated $F_i$. FIG. 4 shows weight fractions of each class of filament numbers (50 filaments) in the nonwoven fabric constituting the fiber-reinforced resin sheet. In the bar graph of FIG. 4, the proportion of the total weight of 2 classes from the side of the smaller number of filaments (filament 0 to 100) in total weight of fiber bundles is the weight fraction Rw (wt %) of the fiber bundles comprising less than 100 filaments. This can be calculated from the measurements as described above by the following equation.

$$Rw(\% \text{ by weight}) = \{Wm - \Sigma(Ws_i)\}/Wm \times 100$$

Of the forms of the nonwoven fabric as described above, particularly preferred are the nonwoven fabrics wherein discontinuous reinforcing fibers are randomly dispersed in the monofilament state. The term "dispersion in the monofilament state" means that proportion of the single filaments having the two-dimensional contact angle of 1° or more is at least 80% in the randomly selected discontinuous reinforcing fibers in the fiber-reinforced resin sheet, and in other words, that the bundle of the single filaments wherein 2 or more single filaments that are in contact and extend in parallel is less than 20% in the component. Accordingly, at least for the discontinuous reinforcing fiber constituting the nonwoven fabric of the fiber-reinforced resin sheet, weight fraction Rw of the fiber bundles containing up to 100 filaments corresponds to 100%.

Figure 5:
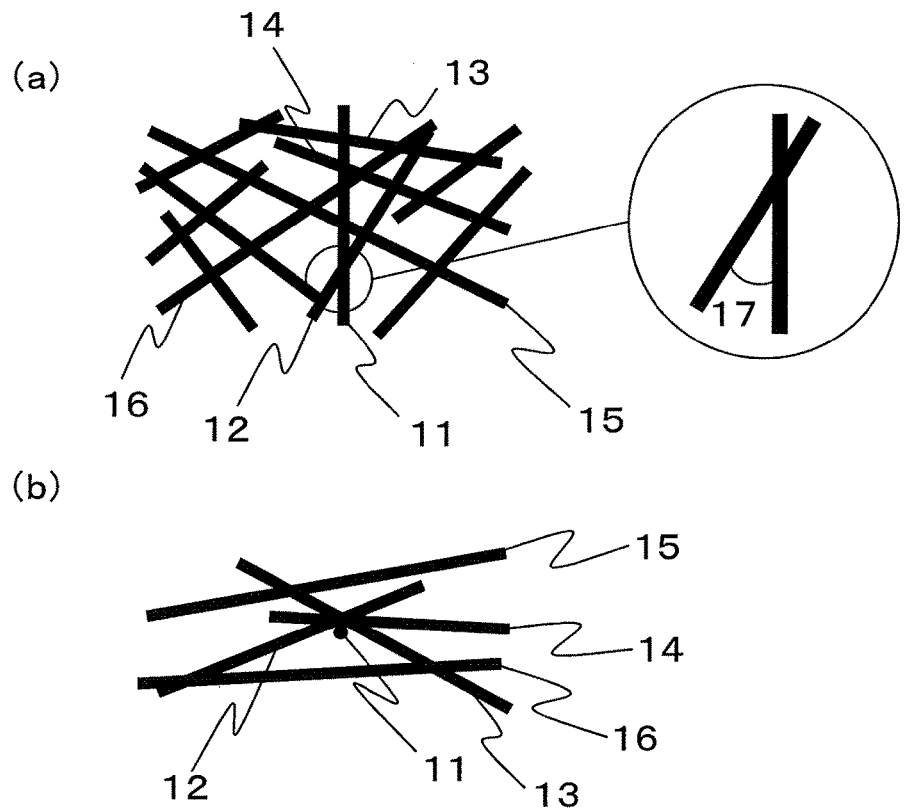
FIG. 5 is a schematic view showing an embodiment of the distribution of the reinforcing fibers in the nonwoven fabric constituted from the reinforcing fibers used in the present invention.

The term "two-dimensional contact angle" used herein means the angle formed between the single filament of the discontinuous reinforcing fiber in the nonwoven fabric and the single filament in contact with the single filament, and this angle is defined as the angle of at least 0° and up to 90° (the one which is an acute angle) of the angles formed by the two single filaments in contact with each other. This two-dimensional contact angle is described in further detail by referring to the drawings. FIGS. 5(a) and (b) are schematic view of an embodiment of the present invention when the reinforcing fibers in the nonwoven fabric are observed in the plane direction (FIG. 5(a)) and in the thickness direction (FIG. 5(b)). With regard to single filament 11, this single filament 11 is observed as if it intersected with single filaments 12 to 16 in FIG. 5(a), while the single filament 11 is not in contact with the single filaments 15 and 16 in FIG. 5(b). In this case, the two-dimensional contact angle for the single filament 11 is evaluated for the single filament 12 to 14, and the two-dimensional contact angle is the angle of at least 0° and up to 90° (the one which is an acute angle), namely, angle 17 of the 2 angles defined by the two single filaments in contact with each other.

The method used for measuring the two-dimensional contact angle is not particularly limited, and exemplary methods include observation of the orientation of the reinforcing fiber from the surface of the fiber-reinforced resin sheet or the surface of the fiber-reinforced resin sheet on the side of the area having exposed reinforcing fibers; observation of the orientation of the reinforcing fiber by using the transmitted light for the nonwoven fabric recovered by the same procedure as the measurement of the volume ratio V m of the reinforcing fiber; and observation of the orientation of the reinforcing fiber by using an optical microscope or an electron microscope. Another exemplary method is taking an image of the oriented reinforcing fiber of the fiber-reinforced resin sheet by X-ray CT. In the case of the radiolucent reinforcing fiber, addition of a tracer fiber in the reinforcing fiber or application of a tracer agent on the reinforcing fiber is preferable for the ease of the observation. Based on the observation as described above, the two-dimensional contact angle is measured by the following procedure. The two-dimensional contact angle is measured for all of the single filaments (single filaments 12 to 16 in FIG. 5) that are in contact with the randomly selected single filament (single filament 11 in FIG. 5). This procedure is repeated for 100 single filaments, and the proportion is calculated from the ratio of the total number of all single filaments which were subjected to the measurement of the two-dimensional contact angle and number of the single filament whose two-dimensional contact angle was at least 1°.

The "random dispersion of the discontinuous reinforcing fiber" means that the average of the two-dimensional oriented angle of the randomly selected discontinuous reinforcing fibers in the fiber-reinforced resin sheet is 30 to 60 degrees. The two-dimensional oriented angle is the angle formed between the single filament of the discontinuous reinforcing fiber and the single filament intersecting with this single filament, and this angle is defined as the angle of at least 0° and up to 90° (the one which is an acute angle) of the angles formed by the two single filaments intersecting with each other. This two-dimensional oriented angle is described in further detail by referring to the drawings. With regard to single filament 11 of FIGS. 5(a) and (b), this single filament 11 intersects with single filaments 12 to 16, with the proviso that the filaments "intersects" when the single filament is observed to intersect with other single filament in the two-dimensional plane being observed. Namely, the single filament 11 and the single filaments 12 to 16 do not necessarily contact with each other, and the case wherein the intersection is observed when projected is also regarded to be the case of intersection. In other words, all of the single filaments 12 to 16 are subject to evaluation of the two-dimensional oriented angle with regard to the single filament 11, and in FIG. 5(a), the two-dimensional oriented angle is the angle of at least 0° and up to 90° (the one which is an acute angle), namely, angle 17 of the 2 angles defined by the two single filaments in contact with each other.

The method used for measuring the two-dimensional oriented angle from the fiber-reinforced resin sheet is not particularly limited, and exemplary methods include observation of the orientation of the reinforcing fiber from the surface of the fiber-reinforced resin sheet or the surface of the fiber-reinforced resin sheet on the side of the area having exposed reinforcing fibers, and the measurement can be conducted by a method similar to the measurement of the two-dimensional contact angle. The average of the two-dimensional oriented angle is measured by the following procedure. The average of the two-dimensional oriented angle between the randomly selected single filament (single filament 11 in FIG. 5) and all single filaments intersecting with this single filament (single filaments 12 to 16 in FIG. 5) was measured. For example, when many single filaments intersects with the single filament, 20 intersecting single filaments may be randomly selected for the measurement, and the average of such measurement may be used as a substitute for the two-dimensional oriented angle. This procedure may be repeated 5 times for different single filament, and the average of the measurement is calculated for use as the average of the two-dimensional oriented angle.

The random distribution of the discontinuous reinforcing fiber in the monofilament state contributes for maximizing the performance realized by the nonwoven fabric comprising the reinforcing fibers dispersed to substantially monofilament state, and a particularly good adhesion is realized at the interface layer. In addition, isotropy is imparted to the fiber-reinforced resin sheet and the integrally molded article prepared by using such fiber-reinforced resin sheet, and there is no need to consider the anisotropy of the mechanical properties in handling the fiber-reinforced resin sheet. In addition, since internal stress in the interface layer caused by the anisotropy of the mechanical properties is reduced, excellent mechanical properties at the interface layer is imparted. In such point of view, the average of the two-dimensional oriented angle of the reinforcing fiber is preferably 40 to 50°, and an angle near the ideal angle or 45° is preferable.

The discontinuous reinforcing fiber may preferably have an average fiber length Ln in the range of 1 to 25 mm. When the average fiber length Ln is in such a range, reinforcing effect of the reinforcing fiber can be improved, the fiber-reinforced resin sheet and the integrally molded article will enjoy excellent mechanical properties and joining strength. Adjustment of the anti-plane angle of the reinforcing fiber in the nonwoven fabric is also facilitated. The average fiber length Ln is obtained by removing the thermoplastic resin component of the fiber-reinforced resin sheet by burning, and randomly selecting 400 fibers from the residual reinforcing fibers and measuring the length to the unit of 10 μm to calculate the number average for use as the average fiber length Ln.

In the present invention, the reinforcing fiber constituting the nonwoven fabric may be, for example, metal fibers such as aluminum, brass, and stainless steel, carbon fibers such as polyacrylonitrile (PAN), rayon, lignin, and pitch, graphite fiber, insulating fibers such as glass, organic fibers such as aramid, PBO, polyphenylene sulfide, polyester, acryl, nylon, and polyethylene, and inorganic fibers such as silicon carbide, and silicon nitride. These fibers may also their surface treated, and exemplary surface treatments included position of a metal as a conductor, treatment with a coupling agent, treatment with a sizing agent, treatment with a binder, and a deposition of an additive. In addition, these reinforcing fibers may be used alone or in combination of two or more types. Of these, the preferred is use of carbon fibers such as PAN, pitch, and rayon having excellent specific strength and specific rigidity in view of the light weight while the use of a glass fiber is preferable in view of improving the economy of the resulting molded article. Use of the carbon fiber in combination with the glass fiber is particularly preferable in view of the balance between mechanical properties and economy. In view of improving the shock absorbency and shape-imparting property of the resulting molded article, use of aramid fiber is preferable, and in particular, use of the carbon fiber in combination with the aramid fiber is preferable in view of the balance between the mechanical properties and shock absorbency. In addition a reinforcing fiber covered with a metal such as nickel, copper, or ytterbium is also usable in view of improving the electroconductivity of the resulting molded article. Of these, more preferred is use of a PAN carbon fiber having high strength and good dynamic properties such as modulus.

Exemplary the thermoplastic resin (A) and the thermoplastic resin (B) used in the present invention include thermoplastic resins selected from crystalline resins such as "polyesters such as polyethylene terephthalate (PET), polybutylene terephthalate (PBT), polytrimethylene terephthalate (PTT), polyethylene naphthalate (PEN), and liquid crystal polyester, polyolefins such as polyethylene (PE), polypropylene (PP), and polybutylene, polyoxymethylene (POM), polyamide (PA), polyarylene sulfide such as polyphenylene sulfide (PPS), polyketone (PK), polyether ketone (PEK), polyether ether ketone (PEEK), polyether ketone ketone (PEKK), polyether nitrile (PEN), fluorine resins such as polytetrafluoroethylene, and liquid crystal polymer (LCP)"; amorphous resins such as "styrene resin, polycarbonate (PC), polymethyl methacrylate (PMMA), polyvinyl chloride (PVC), polyphenylene ether (PPE), polyimide (PI), polyamide imide (PAI), polyetherimide (PEI), polysulfone (PSU), polyether sulfone, polyallylate (PAR)"; phenol resin, phenoxy resin, polystyrene, polyolefin, polyurethane, polyester, polyamide, polybutadiene, polyisoprene, fluorine resin, acrylonitrile, and other thermoplastic elastomers, and copolymers and modified resin thereof. Of these, the preferred is a polyolefin in view of the reduced weight of resulting molded article, a polyamide in view of the strength, an amorphous resin such as a polycarbonate or a styrene in view of surface appearance, a polyarylene sulfide in view of heat resistance, a polyether ether ketone in view of continuous use temperature.

The thermoplastic resin as described above may contain an agent for improving the impact strength such as elastomer or rubber components as well as other fillers and additives to the extent not adversely affecting the objects of the present invention. Exemplary such additional components include inorganic fillers, flame retardant, conductivity imparting agent, nucleating agent, UV absorbent, antioxidant, vibration control agent, antimicrobial agent, insect repellent, deodorize, anticolorant, thermal stabilizer, mold release agent, antistatic agent, plasticizer, lubricant, colorant, pigment, dye, foaming agent, antifoaming agent, and coupling agent.

The reinforcing fiber resin sheet of the present invention satisfying the condition (II) preferably has a fiber content Vfs by volume of 10 to 40% by volume. The Vfs as used herein means content by volume of the reinforcing fiber in the fiber-reinforced resin sheet. The Vfs in such range is preferable in view of the mechanical properties of the molded article or the integrally molded article including the reinforcing fiber resin sheet. When the Vfs is excessively high, the voids in the nonwoven fabric cannot be filled by the thermoplastic resin, and the mechanical properties corresponding to the fiber content may not be obtained.

In the present invention, usable temperature range of the thermoplastic resin (A) and usable temperature range of the thermoplastic resin (B) preferably overlap with each other with the overlapping temperature range of at least 5° C. More specifically, in the case of the fiber-reinforced resin sheet of the present invention satisfying the condition (II), the usable temperature range of the thermoplastic resin (A) constituting the fiber-reinforced resin sheet and the usable temperature range of the thermoplastic resin (B) preferably overlap with each other with the overlapping temperature range of at least 5° C., and in the case of the integrally molded article prepared by using the fiber-reinforced resin sheet of the present invention satisfying the condition (I), the usable temperature range of the thermoplastic resin (A) constituting the fiber-reinforced resin sheet and the usable temperature range of the thermoplastic resin (B) constituting another molded article preferably overlap with each other with the overlapping temperature range of at least 5° C. The usable temperature range of the thermoplastic resin is the temperature range between the usable lowest temperature and usable highest temperature, which is the practical temperature range at which the thermoplastic resin is melted or softened so that it is capable of being impregnated in the reinforcing fiber nonwoven fabric and at which it does not experience thermal deterioration or thermal decomposition by heating. The fiber-reinforced resin sheet fulfilling such relationship can be produced under the single temperature conditions, and the integrally molded article produced by using such fiber-reinforced resin sheet can also be processed under the single temperature conditions, and this leads to reduced production steps and increased process window. Accordingly, a broader overlapping temperature range is preferable, and the overlapping temperature range is preferably at least 15° C., and more preferably at least about 30° C.

When the usable lowest temperature is designated TA1 and the usable highest temperature is designated TA2 in the usable temperature range of the thermoplastic resin (A), and the usable lowest temperature is designated TB1 and the usable highest temperature is designated TB2 in the usable temperature range of the thermoplastic resin (B), these temperatures are the values obtained according to the standards as described below. In the case of the crystalline resin, the usable lowest temperatures TA1 and TB1 are the melting point measured according to JIS K7120 (1987), and in the case of the amorphous resin, the usable lowest temperatures TA1 and TB1 are Vicat softening temperature measured according to JIS K7206 (1999) having 100° C. added thereto. With regard to the usable highest temperatures TA2 and TB2, the temperature obtained by subtracting 50° C. from the temperature at which 1% weight loss from the baseline is observed (weight loss starting point) in the thermogravimetric curve measured according to JIS K7120 (1987) may be used as the practical usable highest temperatures TA2 and TB2.

The production of the fiber-reinforced resin sheet of the present invention may be carried out, for example, by preparing a nonwoven fabric wherein the reinforcing fiber is preliminarily dispersed into strand and/or monofilament state, and impregnating the nonwoven fabric with the thermoplastic resin (A). In the case of producing the fiber-reinforced resin sheet of the present invention satisfying the condition (II), the nonwoven fabric having the thermoplastic resin (A) impregnated therein is further impregnated with the thermoplastic resin (B). Exemplary known methods for producing the reinforcing fiber nonwoven fabric include dry process such as air laid method wherein the sheet is laid after dispersing the reinforcing fiber by an air stream and carding method wherein the sheet is laid after forming the reinforcing fiber with mechanical combing and wet processes such as Radright method wherein the reinforcing fiber which has been agitated in water is made into a sheet. In the methods as described above, exemplary means used for bringing the reinforcing fiber to the state near the monofilament state include, in the case of the dry process, provision of an opening bar, vibration of the opening bar, use of finer curd, adjustment of the curd rotation speed and in the case of the wet process, adjustment of the conditions used in the agitation of the reinforcing fiber, use of reinforcing fiber dispersion at lower concentration, adjustment of the viscosity of the dispersion, suppression of vortex in the transfer of the dispersion. More particularly, production of the reinforcing fiber nonwoven fabric used in the present invention is preferably conducted by wet process, and the volume ratio Vfm of the reinforcing fiber in the reinforcing fiber nonwoven fabric can be readily adjusted, for example, by increasing concentration of the introduced fiber or adjusting flow speed (flow rate) of the dispersion or mesh conveyer speed. For example, when the mesh conveyer speed is reduced in relation to the dispersion flow rate, the fiber in the resulting reinforcing fiber nonwoven fabric is less likely to be oriented in the take up direction, and production of a bulky reinforcing fiber nonwoven fabric is thereby enabled. The reinforcing fiber nonwoven fabric may be constituted solely from the reinforcing fiber, or alternatively, the reinforcing fiber may be mixed with a matrix resin component such powder-form or fiber-form, or the reinforcing fiber may be in the form of a mixture with an organic compound or an inorganic compound, or the reinforcing fibers may be filled with a resin component.

The fiber-reinforced resin sheet of the present invention satisfying the condition (I) is obtained by using the reinforcing fiber nonwoven fabric and applying a pressure with the thermoplastic resin heated to a temperature not less than the melting or softening temperature to thereby impregnate one side of the reinforcing fiber nonwoven fabric with the thermoplastic resin (A). In an embodiment, the molten thermoplastic resin (A) may be impregnated by arranging the thermoplastic resin (A) on one side in thickness direction of the reinforcing fiber nonwoven fabric.

The fiber-reinforced resin sheet of the present invention satisfying the condition (II) is obtained by using the reinforcing fiber nonwoven fabric, and applying a pressure with each of the thermoplastic resin (A) and the thermoplastic resin (B) heated to a temperature not less than their melting or softening temperature to thereby impregnate the reinforcing fiber nonwoven fabric with the thermoplastic resin (A) and the thermoplastic resin (B). More specifically, the fiber-reinforced resin sheet of the present invention satisfying the condition (II) may be prepared by impregnating opposite sides in thickness direction of the reinforcing fiber nonwoven fabric with the molten thermoplastic resin (A) and the thermoplastic resin (B); or by simultaneously conducting the impregnation of the nonwoven fabric with the molten thermoplastic resin (A) and the impregnation of the nonwoven fabric with the molten thermoplastic resin (B) together with their integration.

Exemplary preferable installations for realizing the methods as described above include compression molding machine, double belt press, and calendar roll. The former installation is preferable in the case of a batchwise production, and productivity can be improved by employing an intermittent press system wherein heating press and cooling press are arranged in parallel. The latter installation is preferable in the case of continuous production since the roll-to-roll processing is well adapted for continuous production with high productivity.

In view of efficiently utilizing the joining ability of the fiber-reinforced resin sheet, it is preferable that the first member constituted from the fiber-reinforced resin sheet of the present invention satisfying the condition (I) and the second member which is another molded article constituted from the thermoplastic resin (B) are joined by the impregnation of the thermoplastic resin (B) to the area having exposed reinforcing fibers of the fiber-reinforced resin sheet to produce an integrally molded article; or the first member which is the fiber-reinforced resin sheet of the present invention satisfying the condition (II) or the molded article containing such fiber-reinforced resin sheet and the second member which is another molded article are joined to produce the integrally molded article.

When the fiber-reinforced resin sheet of the present invention satisfying the condition (I) is used, the form of the interface layer in the integrally molded article is formed by the impregnation of the molten thermoplastic resin (B) constituting the second member which is another molded article in the area having exposed reinforcing fibers in the fiber-reinforced resin sheet which results in the formation of the anchoring with the thermoplastic resin (A) constituting the fiber-reinforced resin sheet. When the fiber-reinforced resin sheet of the present invention satisfying the condition (II) is used, the form of the interface layer in the integrally molded article is determined by the fiber-reinforced resin sheet. Accordingly, the integrally molded article of the present invention enables production of an integrally molded article containing the layer containing the thermoplastic resin which is substantially the same as the thermoplastic resin (A) as the substrate; and the layer containing the thermoplastic resin which is substantially the same as the thermoplastic resin (B) as the substrate; wherein these layers are firmly joined for the integration. The term "substantially the same" means that the component constituting at least 50 parts by weight of the resin is shared by both resins. Use of the thermoplastic resin which is the same as the one used in the fiber-reinforced resin sheet is more preferable.

When the integrally molded article is produced by using the fiber-reinforced resin sheet satisfying the condition (II), a molded article for use as the first member is obtained by the molding of the fiber-reinforced resin sheet by a means capable applying heat and pressure, and joining this first member with the second member which is another molded article. Sufficient welding of the thermoplastic resin constituting the second member to the first member is required. Accordingly, the thermoplastic resin constituting the second member and the thermoplastic resin (A) or the thermoplastic resin (B) constituting the joining surface of the first member are substantially the same, and more preferably, the same.

Figure 6:
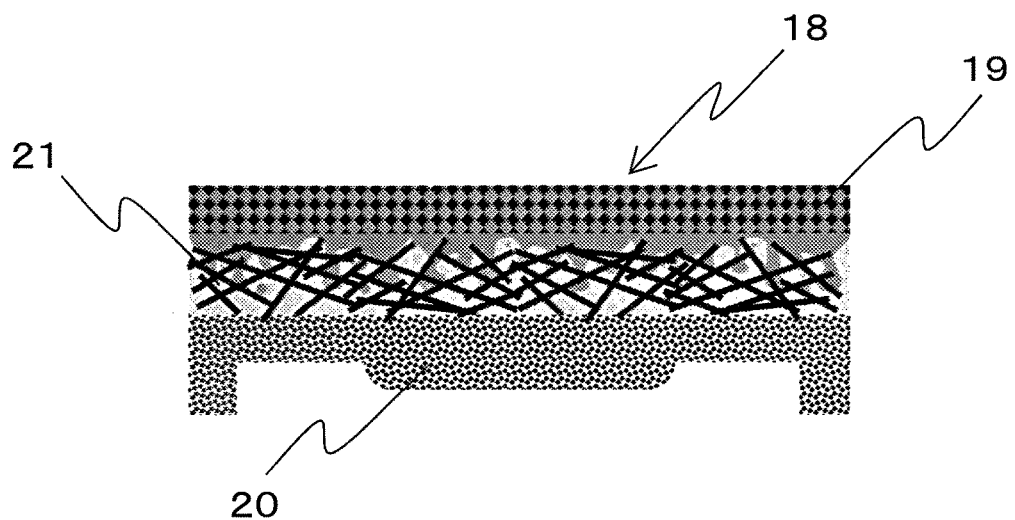
FIG. 6 is a schematic cross-sectional view showing an embodiment of the molded article of the present invention.
Figure 7:
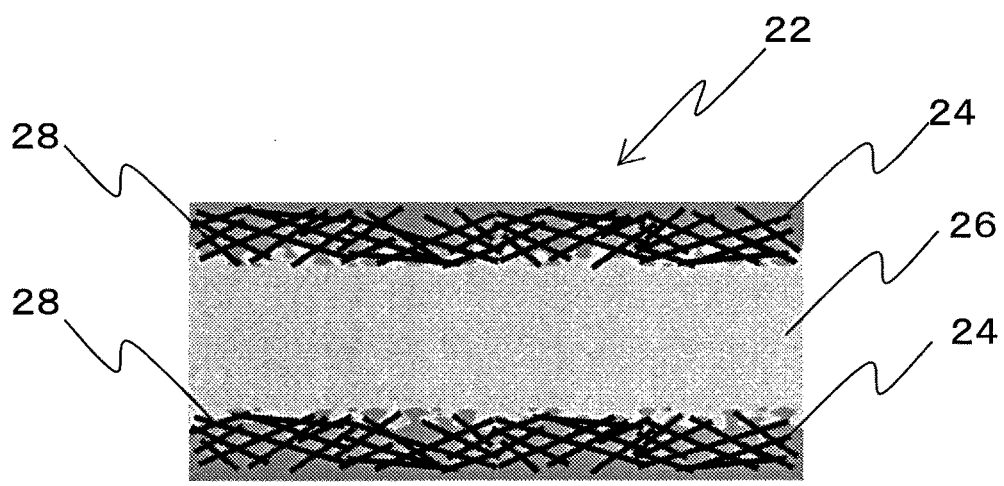
FIG. 7 is a schematic cross-sectional view showing another embodiment of the molded article of the present invention.
Figure 8:
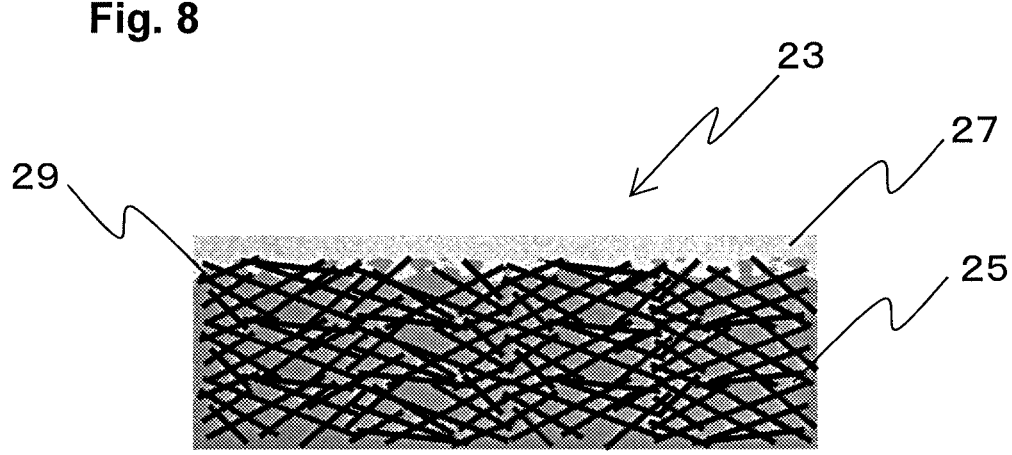
FIG. 8 is a schematic cross-sectional view showing a further embodiment of the molded article of the present invention.

Next, embodiments of the molded article used for the first member are described by referring to FIGS. 6, 7, and 8. As described above, the molded article comprises an integrated structure of the layer containing the thermoplastic resin (A) as the substrate as the substrate, the layer containing the thermoplastic resin (B) as the substrate, and the fiber-reinforced resin sheet disposed therebetween. These layers may be constituted solely by using the same reinforcing fiber nonwoven fabric, or alternatively, by using a fiber-reinforced resin sheet using different reinforcing fiber nonwoven fabric, fiber-reinforced resin sheet reinforced with continuous fiber, or a resin sheet not reinforced with the fiber. For example, the molded article 18 of the FIG. 6 is prepared by using a molding material comprising the woven fabric substrate of the continuous reinforcing fiber for the layer 19 containing the thermoplastic resin (A) as the substrate; a molding material comprising the nonwoven fabric of discontinuous reinforcing fiber for the layer 20 containing the thermoplastic resin (B) as the substrate; and disposing the fiber-reinforced resin sheet 21 of the present invention satisfying the condition (II) between the layer 19 and the layer 20. In the case of such structure, the layer containing the thermoplastic resin (A) as the substrate fulfills design and reinforcement, the layer containing the thermoplastic resin (B) as the substrate fulfills the shape-forming function for realizing the complicated shape, and the resulting molded article will have a separate function-type hybrid structure. In the structure of another embodiments shown in FIGS. 7 and 8, the layer 24 or 25 containing the thermoplastic resin (A) contains the reinforcing fiber; the layer 26 or 27 containing the thermoplastic resin (B) as the substrate comprises the non-reinforced resin layer, and these layers are integrated by the intervening fiber-reinforced resin sheets 28 or 29 of the present invention satisfying the condition (II). The constitution enables production of molded articles 22 and 23 having the sandwich structure (FIG. 7) effective for reducing the weight and cost and the decorative skin structure (FIG. 8) with high designability suitable for exterior member or housing. Various properties such as static and impact properties, heat resistance, chemical resistance, water absorption resistance, and designability can be imparted by using a thermoplastic resin having desired property enables.

Figure 9:
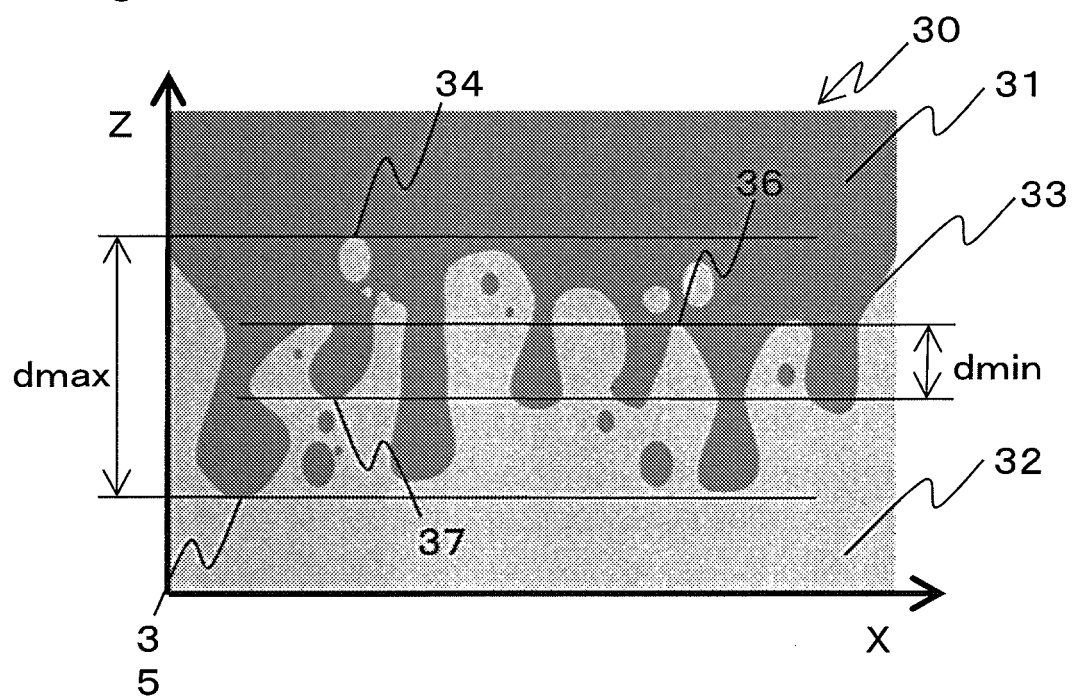
FIG. 9 is a schematic view showing an exemplary expanded cross section of the interface layer in the integrally molded article of the present invention.

The integrally molded article of the present invention has a constitution containing the fiber-reinforced resin sheet, and in the integrally molded article, the thermoplastic resin (A) of the fiber-reinforced resin sheet and the thermoplastic resin (B) constituting the second member or the thermoplastic resin (B) of the fiber-reinforced resin sheet preferably forms an interface layer having the concave-convex shape with the maximum height Ry of at least 50 μm and the average roughness Rz of at least 30 μm for the improved joining. Next, the interface layer formed by the thermoplastic resin (A) and the thermoplastic resin (B) in the integrally molded article of the present invention is described in detail by referring to FIG. 9. FIG. 9 is an expanded view of the interface layer of the thermoplastic resin (A) and the thermoplastic resin (B) based on the cross section perpendicular to the plane direction X of the fiber-reinforced resin sheet 30 for constituting the integrally molded article. In FIG. 9, the thermoplastic resin (A) 31 and the thermoplastic resin (B) 32 are impregnated in the reinforcing fiber nonwoven fabric (not shown), and an interface layer 33 having a concave-convex shape extending in the plane direction X is formed at approximately center of the thickness direction Z of the fiber-reinforced resin sheet by the intervening reinforcing fiber nonwoven fabric. This interface layer has a plurality of concave parts and convex parts extending in the thickness direction Z, and the head in the Z direction between the concave part with maximum depth 34 and the convex part with maximum height 35 is defined as dmax. In FIG. 9, while the parts like concave part 34 may look like independent island parts, the deepest/highest parts including such concave part 34 are regarded the deepest/highest parts of the concave-convex parts. On the other hand, of the concave-convex shapes of the interface layer, the head in the Z direction between the concave part with minimum depth 36 and the convex part with minimum height 37 is defined as dmin. This dmax is defined the maximum height Ry of the present invention, and the average of the dmax and the dmin is defined the average roughness Rz of the present invention.

Such interface layer is preferably formed so that it has a concave-convex shape with the maximum height Ry of at least 50 μm and an average roughness Rz of at least 30 μm. Such embodiment enables production of an integrally molded article wherein the thermoplastic resin (A) is strongly joined with the thermoplastic resin (B). In addition, no particular limitation is required for the combination of the thermoplastic resins in the interface layer of such embodiment. More specifically, the thermoplastic resins of different types form complicated anchoring structure with the intervening reinforcing fiber of the reinforcing fiber nonwoven fabric, and the different thermoplastic resins are mechanically joined. As a consequence, the compatibility and affinity between different resins that should have been considered no longer have to be considered, and the superiority of the present invention resides in that even the resin combination whose joining had been difficult can be readily and firmly joined. In such interface layer, the effects of the present invention are sufficiently attained when the maximum height Ry is at least 50 μm and the average roughness Rz is at least 30 pin, and the effects of the present invention are secured when the Ry is 300 μm and the Rz is 100 μm at most.

As described above, the integrally molded article of the present invention has the common feature that the thermoplastic resin (A) and the thermoplastic resin (B) are impregnated in the reinforcing fiber nonwoven fabric, and that the thermoplastic resin (A) and the thermoplastic resin (B) form the interface layer having a concave-convex shape with the maximum height Ry of at least 50 μm and an average roughness Rz of at least 30 μm irrespective of whether the fiber-reinforced resin sheet of the present invention satisfying the condition (I) is used or the fiber-reinforced resin sheet of the present invention satisfying the condition (II) is used.

In such integrally molded article, the maximum height Ry and the average roughness Rz in the interface layer of the thermoplastic resin (A) and the thermoplastic resin (B) are measured, for example, by the method based on the observation of the cross section of the integrally molded article. More specifically, a polished sample is prepared so that the perpendicular cross section in thickness direction of the integrally molded article is the observation surface. When this sample is observed by a microscope, an image corresponding to FIG. 9 can be confirmed in the field. In this sample, the perpendicular head dmax between the concave part with maximum depth and the convex part with maximum height and the perpendicular head dmin between the concave part with minimum depth and the convex part with minimum height are respectively measured in the concave-convex interface as defined above. This measurement was conducted 10 times for different images, and the maximum value of the dmax measured is used for the maximum height Ry (μm) of the concave-convex shape in the interface layer. The value obtained by dividing the total sum of the dmax and the dmin measured by the N (10 times) is used for the average roughness Rz of the concave-convex shape at the interface layer.

When the fiber-reinforced resin sheet of the present invention satisfying the condition (I) is used, the integrally molded article as described above can be prepared by using its reinforced fiber sheet for the first member, and molding the first member and the second member with the area having exposed reinforcing fibers of the first member in contact with the second member by a means capable of applying heat and pressure. When the fiber-reinforced resin sheet of the present invention satisfying the condition (II) is used, the integrally molded article as described above can be prepared by using the fiber-reinforced resin sheet or the molded article as described above for the first member and welding the first member with the second member which is another molded article. In preparing the integrally molded article, some members may be preliminarily stuck one on another to form a laminate. When the fiber-reinforced resin sheet of the present invention satisfying the condition (I) is used, such laminating unit may contain at least 1 layer with the area having exposed reinforcing fibers in contact with the second member, and when the fiber-reinforced resin sheet of the present invention satisfying the condition (II) is used, such laminating unit may contain at least 1 layer of the fiber-reinforced resin sheet. Other laminating unit is not particularly limited, various function or properties based on the particular laminating unit can be imparted by including such laminating unit. The laminate may contain another laminating unit in addition to the fiber-reinforced resin sheet of the present invention. Such laminating unit is not particularly limited for its constitution, and exemplary constitutions include fiber-reinforced molding substrate such as UD prepreg and woven fabric prepreg reinforced with a continuous reinforcing fiber and GMT, SMC, and long fiber-reinforced prepreg reinforced with a discontinuous reinforcing fiber, or a non-fiber-reinforced molding substrate such as a resin sheet and a foam. Of these, the preferred is a fiber-reinforced molding substrate in view of the mechanical properties of the molded article. More specifically, the preferred is continuous fiber-reinforced prepreg in view of improving the reinforcing effect of the molded article and discontinuous fiber-reinforced prepreg having good shape-imparting ability in the case when the molded article has a complicated shape.

An exemplary common means capable applying heat and pressure in producing the integrally molded article or the molded article include press molding. The press molding may be conducted, for example, by a method wherein the mold is preliminarily heated to a temperature equal to or higher than the molding temperature of the intermediate substrate or the laminate, and the intermediate substrate or the laminate is placed in the heated mold followed by the pressure application by clamping and cooling of the mold while retaining state to thereby obtain the molded article, namely, by so-called hot press molding, or by a method wherein the intermediate substrate or the laminate heated to a temperature equal to or higher than the molding temperature is placed in a mold retained at a temperature less than the solidification temperature of the intermediate substrate or the laminate, and the mold followed by the pressure application by clamping and cooling of the intermediate substrate or the laminate while retaining state to thereby obtain the molded article, namely, by so-called stamping molding or heat and cool molding. Of these press molding methods, the preferred are the stamping molding and the heat and cool molding in view of improving the productivity by speeding up the molding cycle.

The means used for joining the first member and the second member is not particularly limited, and exemplary such means include (i) the method wherein the first member and the second member are preliminarily and separately molded before their joining, and (ii) the method wherein the first member is preliminarily molded and the first member and the second member are joined simultaneously with the molding of the second member. In an exemplary method of the (i), the first member is produced by press molding and the second member is produced press molding or injection molding, and then, the thus produced first and second members are joined by a known method such as hot plate welding, vibration welding, ultrasonic welding, laser welding, electric resistance welding, or induction welding. In an exemplary method of the (ii), the first member is produced by press molding and inserted in a mold for injection molding, and then, the material for the second member is introduced in the mold for injection molding to thereby accomplish the joining by melting or softening the surface of the first member by the heat of the material in the molten or softened state. In another exemplary method of the (ii), the first member is produced by press molding and placed in a mold for press molding, and then, the material for the second member is charged in the mold for press molding to thereby accomplish the joining by the same method as the method as described above. In view of mass production of the integrally molded article, the preferred is the method of (ii), and the injection molding is preferably conducted by insert injection molding or outsert injection molding, and the press molding may be conducted by stamping molding or heat and cool molding. In other words, the production of the integrally molded article of the present invention is most preferably accomplished by the method wherein the second member is a molded article produced by injection molding and this second member is joined to the first member by insert injection molding or outsert injection molding, or the second member is a molded article produced by press molding and this second member is joined to the first member by press molding.

The integrally molded article of the present invention may be used as a mounting member, and exemplary such mounting members include electric or electronic device components such as "housings, trays, chassis, interior members and cases thereof for personal computers, displays, OA devices, mobile phones, personal digital assistants, facsimile machines, compact discs, portable MDs, portable radio cassettes, PDAs (personal digital assistants such as electronic notebooks), video cameras, digital video cameras, optical devices, audios, air conditioners, lighting devices, entertainment articles, toy articles and other home electric appliances", civil engineering/building material components such as "posts, panels and reinforcement materials", "suspension, accelerator and steering components such as various types of members, various types of frames, various types of hinges, various types of arms, various types of axles, various types of bearings for axles, various types of beams, propeller shafts, wheels and gear boxes", "outside plate and body components such as hoods, roofs, doors, fenders, trunk lids, side panels, rear end panels, upper back panels, front bodies, under bodies, various types of pillars, various types of members, various types of frames, various types of beams, various types of supports, various types of rails and various types of hinges", "exterior components such as bumpers, bumper beams, malls, under covers, engine covers, straightening vanes, spoilers, cowl louvers and aero parts", "interior components such as instrument panels, seat frames, door trims, pillar trims, handles and various types of modules", structural components for automobiles and two-wheeled vehicles such as "fuel system, exhaust system and intake system components such as motor components, CNG tanks, gasoline tanks, fuel pumps, air intakes, intake manifolds, carburetor main bodies, carburetor spacers, various types of pipes and various types of valves", components for automobiles and two-wheeled vehicles such as "others, alternator terminals, alternator connectors, IC regulators, potentiometer bases for light dyers, engine cooling water joints, thermostat bases for air conditioners, warm air flow control valves, brush holders for radiator motors, turbine vanes, wiper motor related components, distributors, starter switches, starter relays, window washer nozzles, air conditioner panel switch boards, coils for fuel related electromagnetic valves, battery trays, AT brackets, head lamp supports, pedal housings, protectors, horn terminals, step motor rotors, lamp sockets, lamp reflectors, lamp housings, brake pistons, noise shields, spare tire covers, solenoid bobbins, engine oil filters, ignition system cases, scuff plates, fascias", and aircraft components such as "landing gear pods, winglets, spoilers, edges, ladders, elevators, failings and ribs". In view of the mechanical properties, the integrally molded article of the present invention is preferably used for automobile interior or exterior material, housing of electric or electronic equipment, structural member of a bicycle or sport equipment, aircraft interior finishing material, or transportation package, and in particular, for a module member constituted from a plurality of components.

EXAMPLES

Next, the present invention is described in further detail by the following Examples.

(1) Volume Ratio Vfm1 of the Reinforcing Fiber in the Area Having Exposed Reinforcing Fibers The method used for calculating the volume ratio of the reinforcing fiber in the area having exposed reinforcing fibers from the fiber-reinforced resin sheet having the area having exposed reinforcing fibers is described.

In the fiber-reinforced resin sheet, a razor was inserted between the part impregnated with the thermoplastic resin and the exposed reinforcing fiber, and the part of the exposed reinforcing fiber was separated. This part was sandwiched between stainless steel meshes for use as a sample. The sample was measured for its thickness according to the "method for measuring the thickness of the carbon fiber woven fabric" defined in JIS R7602 (1995) by applying 50 kPa for 20 seconds, and subtracting the thickness of the stainless steel meshes which had been measured in the same condition from this thickness to thereby obtain the thickness tm1 of the area having exposed reinforcing fibers. The stainless steel meshes were removed from the sample, and the weight per unit area Wm was also measured according to the "method for measuring the weight per unit area of the carbon fiber woven fabric" defined in JIS R7602 (1995). The Vfm1 was calculated from the thus measured Wm1 and tm1 by the following equation:

$$Vfm1\ (\%\ by\ volume)=(Wm1/\rho f1)/(S1 \times tm1) \times 100$$

ρf1: density (g/cm³) of the reinforcing fiber
S1: cut out area (cm²) of the sample (2) Volume Ratio Vfm of the Reinforcing Fiber in the Nonwoven Fabric The method used for calculating the volume ratio of the reinforcing fiber in the nonwoven fabric in the fiber-reinforced resin sheet prepared by using a nonwoven fabric is described.

The fiber-reinforced resin sheet was sandwiched between 2 stainless steel meshes (plain weave, 50 meshes per 2.5 cm), and the fiber-reinforced resin sheet was secured to prevent its movement between the meshes by using a screw. This assembly was heated in air at 500° C. for 30 minutes to remove the resin component by burning. It is to be noted that, in Examples 8 and 9, the fiber-reinforced resin sheet was refluxed at 250° C. for 6 hours by using 1-chloronaphthalene to extract the resin component in the resin sheet. The residual sheet after the resin component extraction was also removed by burning to further remove the resin component. The resulting nonwoven fabric was used for the sample together with the stainless steel mesh but after removing the screw. The sample was measured for its thickness according to the "method for measuring the thickness of the carbon fiber woven fabric" defined in JIS R7602 (1995) by applying 50 kPa for 20 seconds, and subtracting the thickness of the stainless steel meshes which had been measured in the same condition from this thickness to thereby obtain the thickness tm of the nonwoven fabric. The stainless steel meshes were then removed from the sample, and the weight per unit area Wm was also measured according to the "method for measuring the weight per unit area of the carbon fiber woven fabric" defined in JIS R7602 (1995). The volume ratio Vfm of the reinforcing fiber in the nonwoven fabric was calculated from the thus measured Wm and tm by the following equation:

$$Vfm(\%\ by\ volume)=(Wm/\rho f)/(S \times tm) \times 100$$

ρf: density (g/cm³) of the reinforcing fiber
S: cut out area (cm²) of the sample (3) Minimum Usable Temperature of Thermoplastic Resin (A) and the Thermoplastic Resin (B) (TA1, TB1)

The melting point or the softening point of the thermoplastic resin (A) and the thermoplastic resin (B) was evaluated as described below. First, of the thermoplastic resin (A) and the thermoplastic resin (B), the melting point of the crystalline resin was measured according to "Method for measuring metastasis temperature of plastics" defined in JIS K7121 (1987). The thermoplastic resin to be measured (for example, the one having the shape of a film or a nonwoven fabric) was dried in a vacuum drier regulated to the furnace temperature of 50° C. for at least 24 hours, and cut into small pieces to prepare samples. The sample was measured by using a differential scanning calorimeter (DSC 200F3 Maia manufactured by NETZSCH) to obtain the melting point according to JIS as described above.

In the meanwhile, of the thermoplastic resin (A) and the thermoplastic resin (B), softening point of the amorphous resins was measured according to A50 method of "Plastics—Thermoplastic materials—Determination of Vicat softening temperature (VST) test" defined in JIS K7206 (1999) by the following procedure. The thermoplastic resin pellet to be measured was dried in a vacuum drier regulated to the furnace temperature of 50° C. for at least 24 hours and molded in a bi-axial kneading injection molding machine (Micro Compounder 15, 12 ml, injection molding machine manufactured by DSM Xplore). A rectangular plate (thickness, 3.2 mm; length and width, 12.5 mm) was cut out from the resulting molded piece for use as the sample. The sample was measured by the heat distortion temperature tester (S3-FH manufactured by TOYO SEIKI Co., Ltd.) to obtain the softening point accordingly to JIS K7206.

The procedure as described above was repeated three times, and average of the temperature measurements was calculated for use as the melting point or the softening point of the thermoplastic resin (A) and the thermoplastic resin (B). The temperature obtained as the melting point was used as the minimum usable temperature of thermoplastic resin (A) and the thermoplastic resin (B) TA1 and TB1 (° C.), and the temperature obtained from the softening point (softening point+100° C.) was used as the minimum usable temperature of thermoplastic resin (A) and the thermoplastic resin (B) TA1 and TB1 (° C.).

(4) Maximum Usable Temperature of Thermoplastic Resin (A) and the Thermoplastic Resin (B) (TA2, TB2)

Weight loss starting temperature of the thermoplastic resin (A) and the thermoplastic resin (B) impregnated in the fiber-reinforced resin sheet was measured according to "Testing Methods of Plastics by Thermogravimetry" defined in JIS K7120 (1987). The film or the nonwoven fabric used for the preparation of the fiber-reinforced resin sheet was dried in a vacuum drier regulated to the furnace temperature of 50° C. for at least 24 hours, and cut into small pieces to prepare samples. The sample was measured by a thermogravimetric analyzer (TG-DTA 2020SA manufactured by Bruker), and thermogravimetric curve according to JIS K7120 was obtained. In the thus obtained thermogravimetric curve, the temperature at which 1% weight loss from the baseline was observed was regarded as the weight loss starting temperature of the Example. The procedure as described above was repeated 3 times, and average was calculated from the resulting weight loss starting temperature for use as the weight loss starting temperature of the thermoplastic resin (A) and the thermoplastic resin (B). The temperature obtained by subtracting 50° C. from the weight loss starting temperature was used practical maximum usable temperature TA2 and TB2 (° C.) of the thermoplastic resin (A) and the thermoplastic resin (B).

(5) Volume Ratio Vfs of the Reinforcing Fiber in the Fiber-Reinforced Resin Sheet After measuring the weight Ws of the fiber-reinforced resin sheet, the fiber-reinforced resin sheet was heated to 500° C. in air for 30 minutes to remove the thermoplastic resin component by burning, and the weight Wf of the residual discontinuous reinforcing fiber was measured. Vfs was calculated the following equation:

$$Vfs(\% \text{ by volume}) = (Wf/\rho f)/\{Wf/\rho f + (Ws - Wf)/\rho r\} \times 100$$

ρf: density (g/cm³) of the reinforcing fiber
ρr: density (g/cm³) of the thermoplastic resin (6) Concave-Convex Shape (Ry, Rz) of the Interface Layer in the Integrally Molded Article A piece having a width of 25 mm was cut out of the integrally molded article and embedded in epoxy resin, and a sample was prepared by polishing the perpendicular cross section in the sheet thickness direction for use as the observation surface. The sample was expanded 200 times by a laser microscope (VK-9510 manufactured by Keyence Corporation), and images at randomly selected 10 locations (with no overlapping fields) were taken. The interface layer formed by the thermoplastic resin (A) and the thermoplastic resin (B) was confirmed in the images taken by the contrast of the resin. When the contrast is unclear, the color shade was clarified by image processing. When the confirmation of the interface layer was still difficult, the image of was taken again for the fiber-reinforced resin sheet or the sample prepared from the integrally molded article having one of the thermoplastic resins (the one having lower TA1 or TB1) impregnated in the second member molten or softened to thereby confirm the interface layer. For the 10 fields taken as described above, perpendicular head dmax between the concave part with maximum depth and the convex part with maximum height and the perpendicular head dmin between the concave part with minimum depth and the convex part with minimum height in the concave-convex interface in each field were measured. The largest value of 10 dmax in each field was used as the maximum height Ry (μm) of the concave-convex shape in the interface layer. Average roughness Rz of the concave-convex shape in the interface layer was also calculated from the dmax and the dmin obtained as described above by the following equation:

$$Rz(\mu m) = \Sigma(d_i max + d_i min)/2n$$

$d_i max$: maximum perpendicular head (i=1, 2, ... 10) (μm) in each field
$d_i min$: maximum perpendicular head (i=1, 2, ... 10) (μm) in each field
n: number of fields observed (7) Weight Ratio (Rw) of the Fine Size Strands in the Reinforcing Fiber Nonwoven Fabric The reinforcing fiber nonwoven fabric was recovered from the fiber-reinforced resin sheet by the procedure similar to the above (1) or (2), and the weight Wm was measured. Next, visually recognized fiber bundles were extracted from the reinforcing fiber nonwoven fabric by forceps, and length of the fiber bundle $Ls_i$, was measured at the precision of 1/100 mm and weight of the fiber bundle $Ws_i$ was measured at the precision of 1/100 mg for the i-th fiber bundle. This procedure was repeated for all fiber bundles (n fiber bundles) in the reinforcing fiber nonwoven fabric. By using the thus obtained length $Ls_i$ and weight $Ws_i$ of the fiber bundle, filament number $F_i$ in the fiber bundle was calculated by the following equation:

$$F_i(\text{number}) = Ws_i/(D \times Ls_i)$$

$F_i$: individual value of the number of filament in the fiber bundle (number) (i=1 to n)
$Ws_i$: weight (mg) of the fiber bundle
$Ls_i$: length of the fiber bundle (mm)
D: fineness per filament (mg/mm)

Based on the $F_i$ calculated as described above, fiber bundles containing at least 100 filaments were selected. Weight fraction Rw of the fiber bundles containing less than 100 filaments was calculated from the weight $Ws_i$ of the fiber bundles by the following equation:

$$Rw(\% \text{ by weight}) = \{Wm - \Sigma(Ws_i)\}/Wm \times 100$$

Wm: weight (mg) of the reinforcing fiber nonwoven fabric (8) Fiber Dispersion Rate of the Reinforcing Fiber Nonwoven Fabric The reinforcing fiber nonwoven fabric was recovered from the fiber-reinforced resin sheet by a procedure similar to the above (1) or (2). By observing the thus obtained reinforcing fiber nonwoven fabric with an electron microscope (VHX-500 manufactured by Keyence Corporation), single filament was randomly selected to measure two-dimensional contact angle between this single filament and another single filament contacting this single filament. With regard to the two-dimensional contact angle, the angle of at least 0° and up to 90° (the one which is an acute angle) of the 2 angles defined by the two single filaments in contact with each other was employed. The measurement of the two-dimensional contact angle was conducted for all single filaments contacting the selected single filament, and this procedure was conducted for 100 single filaments. Based on the thus obtained results, the ratio was calculated from total number of single filaments whose two-dimensional contact angle had been measured and the number of single filaments having the two-dimensional contact angle of at least 1°, and fiber dispersion rate was thereby determined.

(9) Two-Dimensional Oriented Angle of the Reinforcing Fiber Nonwoven Fabric

The reinforcing fiber nonwoven fabric was recovered from the fiber-reinforced resin sheet by a procedure similar to the above (1) and (2). By observing the thus obtained reinforcing fiber nonwoven fabric with an electron microscope (VHX-500 manufactured by Keyence Corporation), single filament was randomly selected to measure two-dimensional oriented angle between this single filament and another single filament intersecting with this single filament. The two-dimensional oriented angle was measured by the observation of the image. With regard to the oriented angle, the angle of at least 0° and up to 90° (the one which is an acute angle) of the 2 angles defined by the crossing two single filaments was. The two-dimensional oriented angle was measured 20 times for each selected single filament. This measurement was repeated for 5 selected single filaments in total, and the average was used for the two-dimensional oriented angle.

(10) Anti-Plane Angle θz of the Reinforcing Fiber in the Fiber-Reinforced Resin Sheet A piece having a width of 25 mm was cut out of the fiber-reinforced resin sheet and embedded in epoxy resin, and a sample was prepared by polishing the perpendicular cross section in the sheet thickness direction for use as the observation surface. The sample was expanded 400 times by a laser microscope (VK-9510 manufactured by Keyence Corporation), and the cross sectional morphology of the fiber was observed. The observation image was analyzed by universal image analysis soft, and individual fiber cross sections in the image were extracted by the program of the software. An ellipse internally contacting the fiber cross section was depicted, and the shape was approximated. (The thus approximated shape is hereinafter referred to as the fiber ellipse.) The fiber ellipse having an aspect ratio (length of the major axis α of the fiber ellipse/length of the minor axis β of the fiber ellipse) of at least 20 was further determined for its angle between the X axis direction and the major axis direction of the fiber ellipse. This procedure was repeated for the observation sample extracted from different part of the fiber-reinforced resin sheet to measure the anti-plane angle for a total of 600 reinforcing fibers. The average was used as the anti-plane angle θz of the fiber-reinforced resin sheet.

Figure 10:
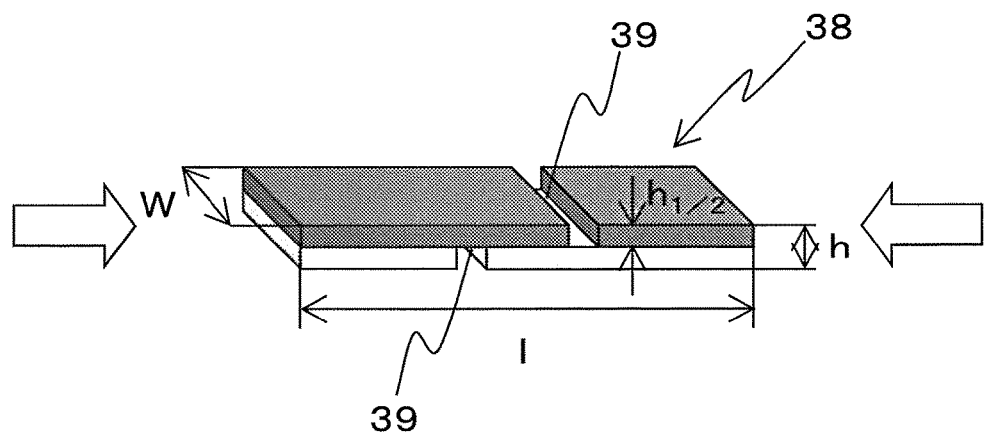
FIG. 10 is a perspective view of the compression shear test piece used in the Examples and Comparative Examples of the present invention.

(11) Shear Strength τ1 and Dispersion CV1 of the Interface Layer in the Molded Article The shear strength τ1 of the interface layer of the molded article was evaluated according to "Test method for interlaminar shear strength of carbon fiber reinforced plastic by double-notch specimen" defined in JIS K7092 (2005). The test piece used for the evaluation of compression shear in this test is shown in FIG. 10. The test piece 38 has a shape with a length 1 and a thickness h, and notches 39 having a width w are formed on opposite surfaces of the test piece at different positions. The notch 39 has a depth of $h_{1/2}$ which is half of the thickness h, and the interface layer formed by the thermoplastic resin (A) and the thermoplastic resin (B) is located at the position of the $h_{1/2}$ corresponding to half thickness. 5 test pieces as described above were prepared, and these test pieces were subjected to a compression test on universal testing machine (universal testing machine Model 4201 manufactured by Instron). Average of all data (n=5) obtained in the test was used as the shear strength τ1 (MPa) at the interface layer of the molded article. CV value (CV1) which is an index for the dispersion of the shear strength was calculated from individual values of the shear strength by the following equation:

$$CV1(\%) = \{\Sigma(\tau 1_i - \tau 1)^2/n\}^{1/2}/\tau 1 \times 100$$

$\tau 1_i$: individual value of the shear strength (i=1, 2, . . . 5) (MPa)

τ1: average shear strength (MPa)

n: number of measurement (n) of the shear strength

(12) Shear Strength τ2 at the Joint of the Integrally Molded Article

Figure 11:
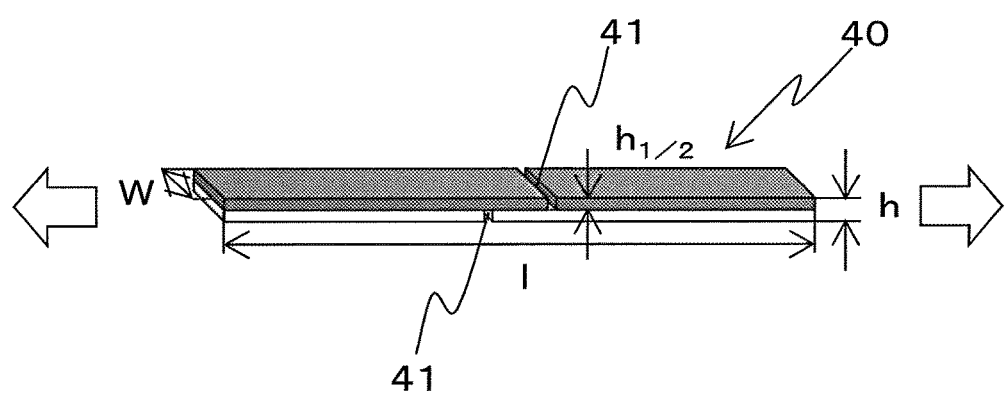
FIG. 11 is a perspective view of the tensile shear adhesion test piece used in the Examples and Comparative Examples of the present invention.

Shear strength τ2 at the joint of the integrally molded article was evaluated by referring "Adhesives—Determination of tensile lap-shear strength of rigid-to-rigid bonded assemblies" defined in JIS K6850 (1999). The test piece used for the evaluation of the tensile shear adhesion in this test was the one cut out from planar section of the integrally molded article obtained in the Examples. The test piece is shown in FIG. 11. The test piece 40 has a shape with a length 1 and a thickness h, and notches 41 having a width w are formed on opposite surfaces of the test piece at different positions. The notch 41 has a depth of $h_{1/2}$ which is half of the thickness h, and the joint of the first member and the second member is located at the position of the $h_{1/2}$ corresponding to half thickness. 5 test pieces as described above were prepared, and these test pieces were subjected to a tensile test on universal testing machine (universal testing machine Model 4201 manufactured by Instron). Average of all data (n=5) obtained in the test was used as the shear strength τ2 (MPa) at the joint of the integrally molded article.

[Reinforcing Fiber A]

A continuous carbon fiber having a total filament number of 12,000 was prepared by spinning and calcining a polymer containing polyacrylonitrile as its main component. The continuous carbon fiber was subjected to an electrolytic surface treatment and dried in hot air of 120° C. to obtain reinforcing fiber A. This reinforcing fiber A had the properties as described below.

Density: 1.80 g/cm³
Single filament diameter: 7 μm
Tensile strength: 4.9 GPa
Tensile modulus: 230 GPa

[Reinforcing Fiber B]

A continuous carbon fiber having a total filament number of 3,000 was prepared by spinning and calcining a polymer containing polyacrylonitrile as its main component. The continuous carbon fiber was subjected to an electrolytic surface treatment and dried in hot air of 120° C. to obtain reinforcing fiber B. This reinforcing fiber B had the properties as described below.

Density: 1.76 g/cm³
Single filament diameter: 7 μm
Tensile strength: 3.5 GPa
Tensile modulus: 230 GPa

[Resin Sheet A]

A sheet having a unit weight of 100 g/m² was prepared by using a master batch comprising 90% by weight of unmodified polypropylene resin ("Prime Polypro" (Registered Trademark) J106MG manufactured by PRIME POLYMER Co, Ltd.) and 10% by weight of acid-modified polypropylene resin ("ADMER" (Registered Trademark) QE800 manufactured by Mitsui Chemicals, Inc.). The resulting resin sheet had the properties as shown in Table 1.

[Resin Sheet B]

A resin film comprising polyamide 6 resin ("AMMAN" (Registered Trademark) CM1021T manufactured by Toray Industries, Inc.) having a unit weight of 124 g/m² was prepared. The resulting resin sheet had the properties as shown in Table 1.

[Resin Sheet C]

A resin film comprising nylon 66 resin ("AMMAN" (Registered Trademark) CM3006 manufactured by Toray Industries, Inc.) having a unit weight of 126 g/m² was prepared. The resulting resin sheet had the properties as shown in Table 1.

[Resin Sheet D]

A resin film comprising polycarbonate resin ("lupilon" (Registered Trademark) H-4000 manufactured by Mitsubishi Engineering-Plastics Corporation) having a unit weight of 132 g/m² was prepared. The resulting resin sheet had the properties as shown in Table 1.

[Resin Sheet E]

A resin nonwoven fabric comprising polyphenylene sulfide resin ("TORELINA" (Registered Trademark) M2888 manufactured by Toray Industries, Inc.) having a unit weight of 67 g/m² was prepared. The resulting resin sheet had the properties as shown in Table 1.

[Resin Sheet F]

A sheet comprising modified polyphenylene ether resin ("NORYL" (Registered Trademark) PPX7110 manufactured by SABIC) having a unit weight of 100 g/m² was prepared. The resulting resin sheet had the properties as shown in Table 1.

[Reinforcing Fiber Nonwoven Fabric A]

The reinforcing fiber A was cut to 6 mm by a strand cutter to obtain chopped reinforcing fiber. 40 liters of a dispersion medium comprising water and a surfactant (polyoxyethylene lauryl ether (product name) manufactured by NACALAI TESQUE, INC.) having a concentration of 0.1% by weight was prepared, and this dispersion medium was injected in a sheet making machine. The sheet making machine is constituted from head stuff tank having a rotary blade agitator (volume, 30 liters) and a lower water tank (volume, 10 liters), and a porous support is provided between the upper stuff tank and the lower water tank. The dispersion medium was agitated by the agitator until the generation of minute air bubbles. The chopped reinforcing fiber (of the weight adjusted to realize the desired unit weight) was introduced in the dispersion medium having the minute air bubbles dispersed therein, and the dispersion was agitated to obtain a slurry having the reinforcing fiber dispersed therein. The slurry was drained through the porous support by sucking from the water tank to remove water and prepare a drained sheet of reinforcing fiber. The drained sheet was dried by a hot air drier under the conditions of 150° C. for 2 hours to thereby obtain a reinforcing fiber nonwoven fabric A having a unit weight of 100 g/m². The resulting reinforcing fiber nonwoven fabric had the properties as shown in Table 2-1.

[Reinforcing Fiber Nonwoven Fabric B]

A reinforcing fiber nonwoven fabric B was obtained by repeating the procedure of producing the reinforcing fiber nonwoven fabric A except that the unit weight of the reinforcing fiber nonwoven fabric was 200 g/m². The resulting reinforcing fiber nonwoven fabric had the properties as shown in Table 2-1.

[Reinforcing Fiber Nonwoven Fabric C]

A reinforcing fiber nonwoven fabric C was obtained by repeating the procedure of producing the reinforcing fiber nonwoven fabric A except that the unit weight of the reinforcing fiber nonwoven fabric was 50 g/m². The resulting reinforcing fiber nonwoven fabric had the properties as shown in Table 2-1.

[Reinforcing Fiber Nonwoven Fabric D]

The reinforcing fiber A was cut to 25 mm by a strand cutter to obtain chopped reinforcing fibers. The resulting chopped reinforcing fibers were allowed to fall freely from a height of 80 cm to obtain a reinforcing fiber nonwoven fabric D comprising randomly distributed chopped carbon fibers. The resulting reinforcing fiber nonwoven fabric had the properties as shown in Table 2-1.

[Reinforcing Fiber Woven Fabric E]

The reinforcing fiber A was aligned in parallel at a density of 1.2 fibers/cm to form a sheet-shape reinforcing fiber group. The reinforcing fiber A was then aligned in the direction perpendicular to the reinforcing fiber group at a density of 1.2 fibers/cm for entwining of the reinforcing fiber A, and a biaxial woven fabric having plain fabric structure was formed by using a weaver. This biaxial woven fabric was treated as the reinforcing fiber woven fabric E. The resulting reinforcing fiber woven fabric had the properties as shown in Table 2-1.

[Reinforcing Fiber Nonwoven Fabric F]

The reinforcing fiber A was cut to 5 mm to obtain chopped reinforcing fibers. The chopped reinforcing fibers were introduced in an opener to obtain a cotton-like aggregate of the reinforcing fibers substantially free from the reinforcing fiber bundle of original size. This reinforcing fiber aggregate was introduced in a carding machine having a cylinder roll with the diameter of 600 mm to form a sheet-form web comprising the reinforcing fibers. The rotation speed of the cylinder roll was 320 rpm, and the doffer speed was 13 m/minute. The resulting web was stuck one on another to obtain the reinforcing fiber nonwoven fabric F. The resulting reinforcing fiber nonwoven fabric had the properties as shown in Table 2-2.

[Reinforcing Fiber Nonwoven Fabric G]

A reinforcing fiber nonwoven fabric G was obtained by repeating the procedure of producing the reinforcing fiber nonwoven fabric A except that the agitation by the rotary blade agitator was less vigorous to intentionally reduce the fiber dispersion. The resulting reinforcing fiber nonwoven fabric had the properties as shown in Table 2-2.

[Reinforcing Fiber Nonwoven Fabric H]

A reinforcing fiber nonwoven fabric H was obtained by repeating the procedure of producing the reinforcing fiber nonwoven fabric A except that the reinforcing fiber A was cut to 12 mm by using a strand cutter to obtain a chopped reinforcing fiber. The resulting reinforcing fiber nonwoven fabric had the properties as shown in Table 2-2.

[Reinforcing Fiber Nonwoven Fabric I]

A reinforcing fiber nonwoven fabric I was obtained by repeating the procedure of producing the reinforcing fiber nonwoven fabric A except that the reinforcing fiber B was cut to 15 mm by using a strand cutter to obtain a chopped reinforcing fiber, and the agitation by the rotary blade agitator was less vigorous and the surfactant was not used for the dispersion medium to intentionally reduce the fiber dispersion. The resulting reinforcing fiber nonwoven fabric had the properties as shown in Table 2-2.

[Reinforcing Fiber Woven Fabric J]

The reinforcing fiber A was opened and aligned in parallel in one direction at a density of 1.4 fibers/cm to form a sheet-shape reinforcing fiber group. An auxiliary fiber (polyamide copolymer fiber having a melting point of 140° C.) was aligned in the direction perpendicular to the reinforcing fiber group at a density of 3 fibers/cm, and a monoaxial sheet retaining the sheet shape was formed by heating with a far-infrared heater. After sandwiching this monoaxial sheet between release papers, the sheet was passed through a double belt press which had been heated to 180° C. at a speed of 1 m/minute by applying a surface pressure of 1 MPa to completely melt the auxiliary fiber and obtain a reinforcing fiber woven fabric J having the reinforcing fiber group filled. The resulting reinforcing fiber woven fabric had the properties as shown in Table 2-2.

[Reinforcing Fiber Nonwoven Fabric K]

A reinforcing fiber nonwoven fabric K was obtained by repeating the procedure of producing the reinforcing fiber nonwoven fabric A except that the reinforcing fiber A was cut to 3 mm to obtain a chopped reinforcing fiber, and the reinforcing fiber nonwoven fabric had a unit weight of 100 g/m². The resulting reinforcing fiber nonwoven fabric had the properties as shown in Table 2-2.

[PP Compound]

The master batch used in the preparation of the reinforcing fiber A and the resin sheet A was compounded in a biaxial extruder (TEX-30α manufactured by The Japan Steel Works, LTD.) to prepare pellets (PP compound) for injection molding having a fiber content of 30% by weight.

[GMT]

A glass fiber-reinforced polypropylene resin molding material (GMT) ("UNI Sheet" (Registered Trademark) P4038-BK31 manufactured by Quadrant) was molded by the same procedure as Example 1 to form a GMT molded to a thickness of 1.6 mm.

Example 1

Figure 12:
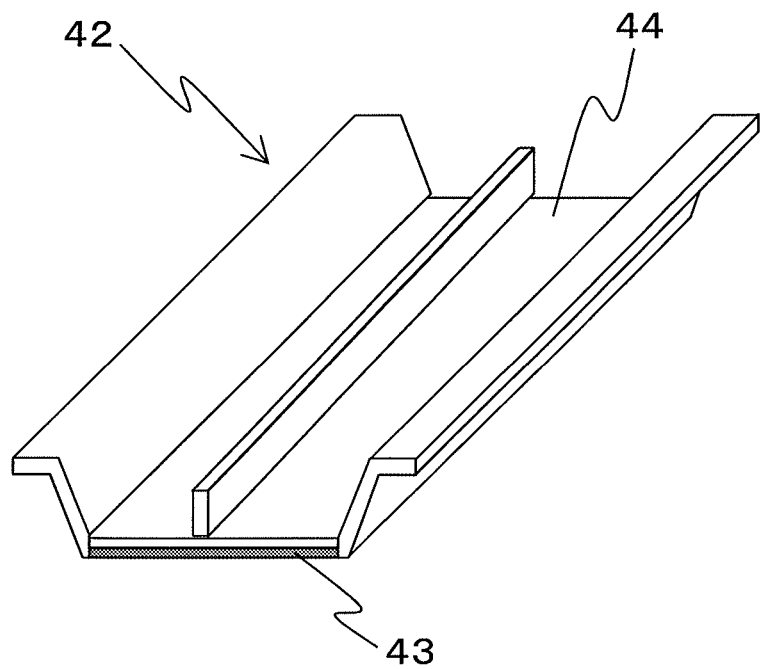
FIG. 12 is a perspective view of the integrally molded article obtained in the Example and Comparative Example of the present invention.

A laminate was prepared by arranging the reinforcing fiber nonwoven fabric A and the resin sheet A (a thermoplastic resin) in the plane direction in the order of [the resin sheet A/the reinforcing fiber nonwoven fabric A/the resin sheet A/the reinforcing fiber nonwoven fabric A/the resin sheet A/the reinforcing fiber nonwoven fabric A/the reinforcing fiber nonwoven fabric A]. The laminate was placed in the mold cavity of the press molding machine preheated to 230° C., and after closing the mold, the laminate was retained in the cavity for 120 seconds and a pressure of 3 MPa was applied. After retaining the pressure for another 60 seconds, the cavity temperature was reduced to 50° C. with the pressure retained, and the mold was opened to obtain the fiber-reinforced resin sheet shown in FIG. 1. The resulting fiber-reinforced resin sheet was used for the first member, and it was inserted in a mold of an injection molding machine so that the surface having the fiber exposed of the fiber-reinforced resin sheet would be the joining surface. Injection molding of the second member was conducted by using the PP compound to obtain an integrally molded article 42 shown in FIG. 12. In the injection molding, the cylinder temperature of the injection molding machine was 200° C., and the mold temperature was 60° C. The integrally molded article of this Example is shown in FIG. 12. Various properties of the fiber-reinforced resin sheet (first member) and the integrally molded article are summarized in Table 3-1.

Example 2

The procedure of Example 1 was repeated except that the resin sheet B was used instead of the resin sheet A for the thermoplastic resin, and the preheating temperature of the laminate was 240° C. to prepare the fiber-reinforced resin sheet. The procedure of Example 1 was also repeated to obtain the integrally molded article. Various properties of the fiber-reinforced resin sheet (first member) and the integrally molded article are summarized in Table 3-1.

Example 3

The procedure of Example 1 was repeated except that the resin sheet C was used instead of the resin sheet A for the thermoplastic resin, and the preheating temperature of the laminate was 280° C. to prepare the fiber-reinforced resin sheet. The procedure of Example 1 was also repeated to obtain the integrally molded article. Various properties of the fiber-reinforced resin sheet (first member) and the integrally molded article are summarized in Table 3-1.

Example 4

The procedure of Example 1 was repeated except that the resin sheet D was used instead of the resin sheet A for the thermoplastic resin, and the preheating temperature of the laminate was 280° C. to prepare the fiber-reinforced resin sheet. The procedure of Example 1 was also repeated to obtain the integrally molded article. Various properties of the fiber-reinforced resin sheet (first member) and the integrally molded article are summarized in Table 3-1.

Example 5

The procedure of Example 1 was repeated except that the resin sheet E was used instead of the resin sheet A for the thermoplastic resin, and the preheating temperature of the laminate was 300° C. to prepare the fiber-reinforced resin sheet. The procedure of Example 1 was also repeated to obtain the integrally molded article. Various properties of the fiber-reinforced resin sheet (first member) and the integrally molded article are summarized in Table 3-1.

Example 6

The procedure of Example 1 was repeated except that the resin sheet F was used instead of the resin sheet A for the thermoplastic resin, and the preheating temperature of the laminate was 280° C. to prepare the fiber-reinforced resin sheet. The procedure of Example 1 was also repeated to obtain the integrally molded article. Various properties of the fiber-reinforced resin sheet (first member) and the integrally molded article are summarized in Table 3-1.

Example 7

The procedure of Example 1 was repeated except that the reinforcing fiber nonwoven fabric B was used instead of the reinforcing fiber nonwoven fabric A for the reinforcing fiber nonwoven fabric to prepare the fiber-reinforced resin sheet. The procedure of Example 1 was also repeated to obtain the integrally molded article. Various properties of the fiber-reinforced resin sheet (first member) and the integrally molded article are summarized in Table 3-1.

Example 8

Figure 13:
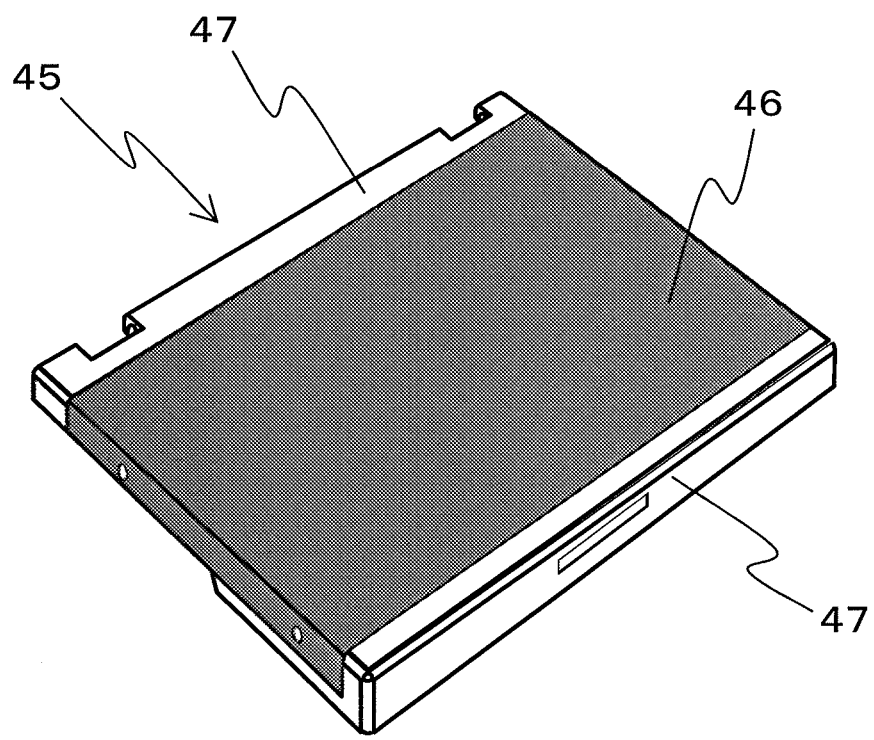
FIG. 13 is a perspective view of the integrally molded article obtained in the Example and Comparative Example of the present invention.

The procedure of Example 1 was repeated except that the reinforcing fiber nonwoven fabric C was used instead of the reinforcing fiber nonwoven fabric A for the reinforcing fiber nonwoven fabric to prepare the fiber-reinforced resin sheet, and the resulting fiber-reinforced resin sheet was used for the first member. In the meanwhile, GMT used for the second member was placed in a hot plate-heating type preheater which had been preliminarily heated to 230° C., and the GMT was preheated for 1 minute with a pressure of 0.1 MPa applied. Next, the fiber-reinforced resin sheet was placed in the mold for press molding preheated to 120° C. so that the surface having the fiber exposed of the fiber-reinforced resin sheet would be the joining surface, and the preheated GMT was placed on the fiber-reinforced resin sheet. After closing the mold, a pressure of 15 MPa was applied and this state was retained for 120 seconds with the pressure applied to obtain an integrally molded article 45 having the second member joined by the press molding. The integrally molded article of this Example is shown in FIG. 13. Various properties of the resulting integrally molded article are summarized in Table 3-1.

Example 9

The procedure of Example 2 was repeated except that the reinforcing fiber nonwoven fabric D was used instead of the reinforcing fiber nonwoven fabric A for the reinforcing fiber nonwoven fabric to prepare the fiber-reinforced resin sheet. The procedure of Example 2 was also repeated to obtain the integrally molded article. Various properties of the fiber-reinforced resin sheet (first member) and the integrally molded article are summarized in Table 3-1.

Example 10

The procedure of Example 2 was repeated except that the laminate was prepared by arranging the reinforcing fiber nonwoven fabric and the resin sheet in the plane direction in the order of [the resin sheet B/the reinforcing fiber nonwoven fabric B/the resin sheet B/the reinforcing fiber nonwoven fabric B/the resin sheet B/the reinforcing fiber nonwoven fabric B/the reinforcing fiber nonwoven fabric B] to obtain the fiber-

Example 11

A laminate was prepared by sandwiching two sheets of the reinforcing fiber nonwoven fabric F with one sheet of the resin sheet A (the thermoplastic resin (A)) on one side and one sheet of the resin sheet B (the thermoplastic resin (B)) on the other side. The laminate was placed in the mold cavity of the press molding machine preheated to 230° C., and after closing the mold, the laminate was retained in the cavity for 120 seconds and a pressure of 3 MPa was applied. After retaining the pressure for another 60 seconds, the cavity temperature was reduced to 50° C. with the pressure retained, and the mold was opened to obtain the fiber-reinforced resin sheet. Properties of the fiber-reinforced resin sheet are shown in Table 3-2.

Example 12

The procedure of Example 11 was repeated except that the reinforcing fiber nonwoven fabric K was used instead of the reinforcing fiber nonwoven fabric F to prepare the fiber-reinforced resin sheet. Properties of the resulting fiber-reinforced resin sheet are shown in Table 3-2.

Example 13

The procedure of Example 11 was repeated except that the reinforcing fiber nonwoven fabric G was used instead of the reinforcing fiber nonwoven fabric F to prepare the fiber-reinforced resin sheet. Properties of the resulting fiber-reinforced resin sheet are shown in Table 3-2.

Example 14

The procedure of Example 11 was repeated except that the reinforcing fiber nonwoven fabric H was used instead of the reinforcing fiber nonwoven fabric F to prepare the fiber-reinforced resin sheet. Properties of the resulting fiber-reinforced resin sheet are shown in Table 3-2.

Example 15

The procedure of Example 11 was repeated except that the reinforcing fiber nonwoven fabric I was used instead of the reinforcing fiber nonwoven fabric F to prepare the fiber-reinforced resin sheet. Properties of the resulting fiber-reinforced resin sheet are shown in Table 3-2.

Example 16

A fiber-reinforced resin sheet was obtained by repeating the procedure of Example 11 except that the laminate was prepared by sandwiching one sheet of the reinforcing fiber nonwoven fabric G with one sheet of the resin sheet A (the thermoplastic resin (A)) on one side and one sheet of the resin sheet B (the thermoplastic resin (B)) on the other side. Properties of the fiber-reinforced resin sheet are shown in Table 3-2.

Example 17

Laminate A comprising a laminate of one sheet of the reinforcing fiber nonwoven fabric G and one sheet of the resin sheet A (the thermoplastic resin (A)) and 3 sets of laminate B comprising a laminate of 3 sheets of the reinforcing fiber nonwoven fabric G and three sheets of the resin sheet C (the thermoplastic resin (B)), namely, 4 sets in total of laminates were prepared. In this process, the mold for the press molding was used by retaining the lower mold at a temperature of 220° C. and the upper mold at a temperature of 270° C. Each of the laminate B was introduced in an IR heater so that the resin sheet was on the upper side, and the laminates B were heated until the temperature of the resin sheet C reached 280° C. In the meanwhile, until the laminate B reached the predetermined temperature, the laminate A was placed in the lower mold so that the resin sheet was in contact with the mold for simultaneous preheating. All of the preheated laminates B were placed on the laminate A in the mold cavity so that the resin sheet was on the upper side, and the mold was closed. After retaining the pressure of 3 MPa for another 60 seconds, the cavity temperature was reduced to 50° C. with the pressure retained, and the mold was opened to obtain the fiber-reinforced resin sheet. Properties of the fiber-reinforced resin sheet are shown in Table 3-2.

Example 18

A laminate was prepared by sandwiching two sheets of the reinforcing fiber nonwoven fabric G with one sheet of the resin sheet C (the thermoplastic resin (A)) on one side and two sheets of the resin sheet E (the thermoplastic resin (B)) on the other side. The laminate was placed in the mold cavity of the press molding machine preheated to 285° C., and after closing the mold, the laminate was retained in the cavity for 120 seconds and a pressure of 3 MPa was applied. After retaining the pressure for another 60 seconds, the cavity temperature was reduced to 50° C. with the pressure retained, and the mold was opened to obtain the fiber-reinforced resin sheet. Properties of the fiber-reinforced resin sheet are shown in Table 3-2.

Example 19

A laminate was prepared by sandwiching two sheets of the reinforcing fiber nonwoven fabric G with one sheet of the resin sheet D (the thermoplastic resin (A)) on one side and two sheets of the resin sheet E (the thermoplastic resin (B)) on the other side. The laminate was placed in the mold cavity of the press molding machine preheated to 300° C., and after closing the mold, the laminate was retained in the cavity for 120 seconds and a pressure of 3 MPa was applied. After retaining the pressure for another 60 seconds, the cavity temperature was reduced to 50° C. with the pressure retained, and the mold was opened to obtain the fiber-reinforced resin sheet. Properties of the fiber-reinforced resin sheet are shown in Table 3-2.

Comparative Example 1

The procedure of Example 2 was repeated except that the reinforcing fiber nonwoven fabric E was used instead of the reinforcing fiber nonwoven fabric A for the reinforcing fiber nonwoven fabric to prepare the fiber-reinforced resin sheet. The procedure of Example 2 was also repeated to obtain the integrally molded article. Various properties of the fiber-reinforced resin sheet (first member) and the integrally molded article are summarized in Table 4-1.

Comparative Example 2

The procedure of Example 2 was repeated except that the laminate was prepared by applying heat and pressure after arranging the reinforcing fiber nonwoven fabric and the resin sheet in the plane direction in the order of [the resin sheet B/the reinforcing fiber nonwoven fabric A/the resin sheet B/the reinforcing fiber nonwoven fabric A/the reinforcing fiber nonwoven fabric A/the resin sheet B/the reinforcing fiber nonwoven fabric A/the resin sheet B] to obtain the fiber-reinforced resin sheet having a reinforcing fiber volume ratio Vfm1 in the area having the exposed reinforcing fiber of 0% by volume. The procedure of Example 2 was also repeated to obtain the integrally molded article. Various properties of the fiber-reinforced resin sheet (first member) and the integrally molded article are summarized in Table 4-1.

Comparative Example 3

The procedure of Example 11 was repeated except that the 3 sheets of the reinforcing fiber nonwoven fabric J were used instead of the reinforcing fiber nonwoven fabric F to prepare the fiber-reinforced resin sheet. Properties of the resulting fiber-reinforced resin sheet are shown in Table 4-2.

Comparative Example 4

The procedure of Comparative Example 3 was repeated except that the pressure applied was 10 MPa to prepare the fiber-reinforced resin sheet. Properties of the resulting fiber-reinforced resin sheet are shown in Table 4-2.

Comparative Example 5

The procedure of Example 11 was repeated except that 3 sheets of the reinforcing fiber woven fabric E were used instead of the reinforcing fiber nonwoven fabric F to prepare the fiber-reinforced resin sheet. Properties of the resulting fiber-reinforced resin sheet are shown in Table 4-2.

Comparative Example 6

The procedure of Comparative Example 5 was repeated except that the pressure applied was 10 MPa to prepare the fiber-reinforced resin sheet. Properties of the resulting fiber-reinforced resin sheet are shown in Table 4-2.

Comparative Example 7

The procedure of Example 11 was repeated except that the reinforcing fiber nonwoven fabric D was used instead of the reinforcing fiber nonwoven fabric F to prepare the fiber-reinforced resin sheet. Properties of the resulting fiber-reinforced resin sheet are shown in Table 4-2.

Comparative Example 8

A laminate of one sheet of the reinforcing fiber nonwoven fabric G and one sheet of the resin sheet A (the thermoplastic resin (A)) was placed in the mold cavity of the press molding machine preheated to 200° C., and after closing the mold, the laminate was retained in the cavity for 120 seconds and a pressure of 3 MPa was applied. After retaining the pressure for another 60 seconds, the cavity temperature was reduced to 50° C. with the pressure retained, and the mold was opened to obtain the precursor of the fiber-reinforced resin sheet (A). Next, a laminate of one sheet of the reinforcing fiber nonwoven fabric G and one sheet of the resin sheet B (the thermoplastic resin (B)) was placed in the mold cavity of the press molding machine preheated to 230° C., and the precursor of the fiber-reinforced resin sheet (B) was prepared by similar procedure. The laminate of the thus obtained precursors of the fiber-reinforced resin sheet (A) and (B) was placed in the mold cavity of the press molding machine preheated to 210° C., and the fiber-reinforced resin sheet was prepared by similar procedure. Properties of the fiber-reinforced resin sheet are shown in Table 4-2.

Reference Examples 1 to 13

Molding substrates 1 to 13 were prepared by repeating the procedure of Example 11 except that the type and number of the reinforcing fiber mat and the resin sheet used for the laminate as well as the mold temperature were different. The conditions used in the molding and the properties of each molding substrate are shown in Table 5.

Reference Example 14

The glass fiber-reinforced polypropylene resin molding material (GMT) ("UNI Sheet" (Registered Trademark) P4038-BK31 manufactured by Quadrant) was molded by the same procedure as Example 11 to form a plate having a thickness of 1.6 mm. The resulting plate was used for the molding substrate. This molding substrate had the properties as shown in Table 5.

Example 20

Figure 14:
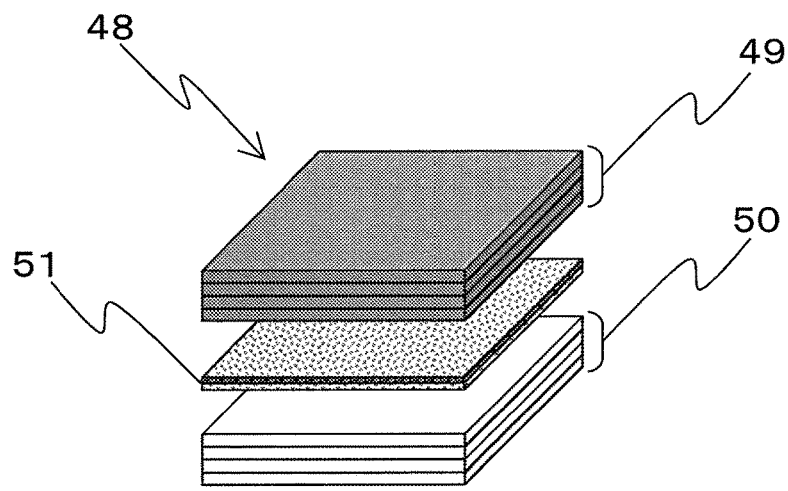
FIG. 14 is a perspective view showing an embodiment of the preform in an Example of the present invention.

A preform was prepared by using one sheet of the fiber-reinforced resin sheet of Example 11, 4 sheets of the molding substrate of Reference Example 6 (laminating unit (X)), and 4 sheets of the molding substrate of Reference Example 7 (laminating unit (Y)). The preform was placed in a hot plate-heating type preheater which had been preliminarily heated to 230° C., and the preform was preheated for 2 minutes with a pressure of 0.1 MPa applied. Next, the laminate taken out of the preheater was placed in the mold cavity preheated to 120° C., and after closing the mold, a pressure of 15 MPa was applied and this state was retained for 120 seconds with the pressure applied. The mold was then opened to obtain a molded article. The laminate of this Example is shown in FIG. 14. The resulting molded article had the properties shown in Table 6-1.

Example 21

A molded article was prepared by repeating the procedure of Example 12 except that the preform was prepared by using one sheet of the fiber-reinforced resin sheet of Example 12, 4 sheets of the molding substrate of Reference Example 8 (laminating unit (X)), and 4 sheets of the molding substrate of Reference Example 9 (laminating unit (Y)). The resulting molded article had the properties shown in Table 6-1.

Example 22

A molded article was prepared by repeating the procedure of Example 20 except that the preform was prepared by using one sheet of the fiber-reinforced resin sheet of Example 13, 4 sheets of the molding substrate of Reference Example 1 (laminating unit (X)), and 4 sheets of the molding substrate of Reference Example 2 (laminating unit (Y)). The resulting molded article had the properties shown in Table 6-1.

Example 23

A molded article was prepared by repeating the procedure of Example 20 except that the preform was prepared by using one sheet of the fiber-reinforced resin sheet of Example 14, 4 sheets of the molding substrate of Reference Example 10 (laminating unit (X)), and 4 sheets of the molding substrate of Reference Example 11 (laminating unit (Y)). The resulting molded article had the properties shown in Table 6-1.

Example 24

A molded article was prepared by repeating the procedure of Example 20 except that the preform was prepared by using one sheet of the fiber-reinforced resin sheet of Example 15, 4 sheets of the molding substrate of Reference Example 12 (laminating unit (X)), and 4 sheets of the molding substrate of Reference Example 13 (laminating unit (Y)). The resulting molded article had the properties shown in Table 6-1.

Example 25

A molded article was prepared by repeating the procedure of Example 20 except that the preform was prepared by using one sheet of the fiber-reinforced resin sheet of Example 18, 4 sheets of the molding substrate of Reference Example 1 (laminating unit (X)), and 4 sheets of the molding substrate of Reference Example 2 (laminating unit (Y)). The resulting molded article had the properties shown in Table 6-1.

Example 26

A preform was prepared by using one sheet of the fiber-reinforced resin sheet of Example 18, 4 sheets of the molding substrate of Reference Example 3 (laminating unit (X)), and 4 sheets of the molding substrate of Reference Example 5 (laminating unit (Y)). The preform was placed in a hot plate-heating type preheater which had been preliminarily heated to 300° C., and the preform was preheated for 2 minutes with a pressure of 0.1 MPa applied. Next, the preform taken out of the preheater was placed in the mold cavity which had been preheated to 180° C., and after closing the mold, a pressure of 15 MPa was applied and this state was retained for 120 seconds with the pressure applied. The mold was then opened to obtain the molded article. The resulting molded article had the properties shown in Table 6-1.

Example 27

A molded article was prepared by repeating the procedure of Example 26 except that the preform was prepared by using one sheet of the fiber-reinforced resin sheet of Example 19, 4 sheets of the molding substrate of Reference Example 4 (laminating unit (X)), and 4 sheets of the molding substrate of Reference Example 5 (laminating unit (Y)). The resulting molded article had the properties shown in Table 6-1.

Example 28

Figure 15:
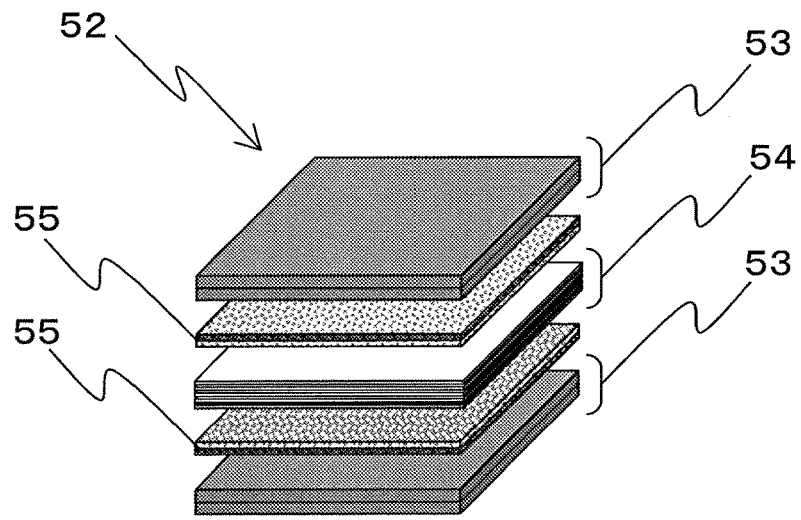
FIG. 15 is a perspective view showing an embodiment of the preform of in an Example of the present invention.

A preform was prepared by using two sheets of the fiber-reinforced resin sheet of Example 18, 2 sheets of the molding substrate of Reference Example 2 (laminating unit (X)), and 12 sheets of the resin sheet A (laminating unit (Y)). This preform was placed in the mold cavity that had been retained at 180° C., and after closing the mold, a pressure of 1 MPa was applied and this state was retained for 240 seconds. After cooling the mold to 50° C., the mold was taken out. The cavity clearance was adjusted to 4.5 mm (measured when the mold was completely shut). The preform of this Example is shown in FIG. 15. The resulting molded article had the properties shown in Table 6-1.

Comparative Example 9

Figure 16:
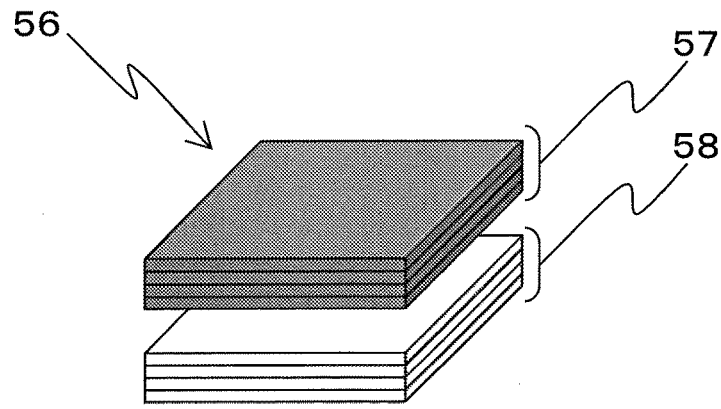
FIG. 16 is a perspective view showing an embodiment of the preform of in a Comparative Example of the present invention.

A molded article was prepared by repeating the procedure of Example 20 except that the preform was prepared by using 4 sheets of the molding substrate of Reference Example 6 (laminating unit (X)) and 4 sheets of the molding substrate of Reference Example 7 (laminating unit (Y)). The preform of this Comparative Example is shown in FIG. 16. The resulting molded article had the properties shown in Table 6-2.

Comparative Example 10

A molded article was prepared by repeating the procedure of Example 20 except that the preform was prepared by using 4 sheets of the molding substrate of Reference Example 8 (laminating unit (X)) and 4 sheets of the molding substrate of Reference Example 9 (laminating unit (Y)). The resulting molded article had the properties shown in Table 6-2.

Comparative Example 11

A molded article was prepared by repeating the procedure of Example 20 except that the preform was prepared by using 4 sheets of the molding substrate of Reference Example 1 (laminating unit (X)) and 4 sheets of the molding substrate of Reference Example 2 (laminating unit (Y)). The resulting molded article had the properties shown in Table 6-2.

Comparative Example 12

A molded article was prepared by repeating the procedure of Example 20 except that the preform was prepared by using 4 sheets of the molding substrate of Reference Example 10 (laminating unit (X)) and 4 sheets of the molding substrate of Reference Example 11 (laminating unit (Y)). The resulting molded article had the properties shown in Table 6-2.

Comparative Example 13

A molded article was prepared by repeating the procedure of Example 22 except that the preform was prepared by using 4 sheets of the molding substrate of Reference Example 12 (laminating unit (X)) and 4 sheets of the molding substrate of Reference Example 13 (laminating unit (Y)). The resulting molded article had the properties shown in Table 6-2.

Comparative Example 14

A molded article was prepared by repeating the procedure of Example 26 except that the preform was prepared by using 4 sheets of the molding substrate of Reference Example 3 (laminating unit (X)) and 4 sheets of the molding substrate of Reference Example 5 (laminating unit (Y)). The resulting molded article had the properties shown in Table 6-2.

Comparative Example 15

A molded article was prepared by repeating the procedure of Example 27 except that the preform was prepared by using 4 sheets of the molding substrate of Reference Example 4 (laminating unit (X)) and 4 sheets of the molding substrate of Reference Example 5 (laminating unit (Y)). The resulting molded article had the properties shown in Table 6-2.

Comparative Example 16

A molded article was prepared by repeating the procedure of Example 20 except that the preform was prepared by using 8 sheets of the molding substrate of Reference Example 1 (laminating unit (X)). The resulting molded article had the properties shown in Table 6-2.

Comparative Example 17

A molded article was prepared by repeating the procedure of Example 20 except that the preform was prepared by using one sheet of the fiber-reinforced resin sheet of Comparative Example 6, 4 sheets of the molding substrate of Reference Example 1 (laminating unit (X)), and 4 sheets of the molding substrate of Reference Example 2 (laminating unit (Y)). The resulting molded article had the properties shown in Table 6-2.

Example 29

A preform was prepared by using one sheet of the fiber-reinforced resin sheet of Example 13 and one sheet of the molding substrate of Reference Example 2. A plate molded article having a length of 300 mm, a width of 300 mm, and a thickness of 1.1 mm was prepared by repeating the molding procedure of Example 20 except that the preform was placed in a hot plate-heating type preheater which had been preliminarily heated to 230° C. and the preform was preheated for 1 minute with a pressure of 0.1 MPa applied. A rectangular piece of a length of 180 mm, and a width of 70 mm was cut out of the resulting plate molded article, and this piece was used for the first member. In the meanwhile, for use as a material for the second member, a master batch used in the preparation of the reinforcing fiber A and the resin sheet A was compounded in a biaxial extruder (TEX-30α manufactured by The Japan Steel Works, LTD.) to prepare pellets for injection molding having a fiber content of 30% by weight. Next, the first member prepared as described above was inserted in a mold of an injection molding machine so that the side of the fiber-reinforced resin sheet would be the joining surface. Injection molding of the second member was conducted by using the injection molding pellets prepared as described above to obtain an integrally molded article 1. In the injection molding, the cylinder temperature of the injection molding machine was 200° C., and the mold temperature was 60° C. The integrally molded article of this Example is shown in FIG. 12. The resulting integrally molded article had the properties shown in Table 7.

Example 30

An integrally molded article was prepared by repeating the procedure of Example 29 except that a rectangular piece having a length of 180 mm and a width of 70 mm was cut out of the fiber-reinforced resin sheet of Example 17 and this was used for the first member. The resulting integrally molded article had the properties shown in Table 7.

Comparative Example 18

A preform was prepared by two sheets of the molding substrate of Reference Example 2. A plate molded article having a length of 300 mm, a width of 300 mm, and a thickness of 1.1 mm was prepared by repeating the molding procedure of Example 20 except that the preform was placed in a hot plate-heating type preheater which had been preliminarily heated to 230° C. and the preform was preheated for 1 minute with a pressure of 0.1 MPa applied. An integrally molded article was obtained by repeating the subsequent procedure of Example 29. The resulting integrally molded article had the properties shown in Table 7.

Comparative Example 19

A preform was prepared by two sheets of the molding substrate of Reference Example 3. The preform was placed in a hot plate-heating type preheater which had been preliminarily heated to 280° C., and the preform was preheated for 1 minute with a pressure of 0.1 MPa applied. Next, the preform taken out of the preheater was placed in the mold cavity which had been preheated to 150° C., and after closing the mold, a pressure of 15 MPa was applied and this state was retained for 120 seconds with the pressure applied. The mold was then opened to obtain a plate molded article having a length of 300 mm, a width of 300 mm, and a thickness of 1.1 mm. An integrally molded article was obtained by repeating the subsequent procedure of Example 29. The resulting integrally molded article had the properties shown in Table 7.

Comparative Example 20

An integrally molded article was prepared by repeating the procedure of Example 29 except that the preform was prepared by using two molding substrates of Reference Example 1. The resulting integrally molded article had the properties shown in Table 8.

Example 31

A preform was prepared by using one sheet of the fiber-reinforced resin sheet of Example 13 and one sheet of the molding substrate of Reference Example 2. A plate molded article having a length of 300 mm, a width of 300 mm, and a thickness of 1.1 mm was prepared by repeating the molding procedure of Example 20 except that the preform was placed in a hot plate-heating type preheater which had been preliminarily heated to 230° C. and the preform was preheated for 1 minute with a pressure of 0.1 MPa applied. A rectangular piece of a length of 250 mm and a width of 160 mm was cut out of the resulting plate molded article, and this piece was used for the first member. In the meanwhile, the molding substrate of Reference Example 14 used for the second member was placed in a hot plate-heating type preheater which had been preliminarily heated to 230° C., and the molding substrate was preheated for 1 minute with a pressure of 0.1 MPa applied. Next, the first member was placed in the mold for press molding preheated to 120° C. so that the side of the resin sheet A would be the upper side, and the preheated molding substrate was placed on the fiber-reinforced resin sheet. After closing the mold, a pressure of 15 MPa was applied and this state was retained for 120 seconds with the pressure applied to obtain an integrally molded article having the second member joined by the press molding. The integrally molded article of this Example is shown in FIG. 13. Various properties of the resulting integrally molded article are shown in Table 8.

Example 32

An integrally molded article was prepared by repeating the procedure of Example 31 except that a rectangular piece having a length of 250 mm and a width of 160 mm was cut out of the fiber-reinforced resin sheet of Example 17 and this was used for the first member. The resulting integrally molded article had the properties shown in Table 8.

Comparative Example 21

A preform was prepared by two sheets of the molding substrate of Reference Example 2. A plate molded article having a length of 300 mm, a width of 300 mm, and a thickness of 1.1 mm was prepared by repeating the molding procedure of Example 20 except that the preform was placed in a hot plate-heating type preheater which had been preliminarily heated to 230° C. and the preform was preheated for 1 minute with a pressure of 0.1 MPa applied. An integrally molded article was obtained by repeating the subsequent procedure of Example 31. The resulting integrally molded article had the properties shown in Table 8.

Comparative Example 22

A preform was prepared by two sheets of the molding substrate of Reference Example 3. The preform was placed in a hot plate-heating type preheater which had been preliminarily heated to 280° C., and the preform was preheated for 1 minute with a pressure of 0.1 MPa applied. Next, the preform taken out of the preheater was placed in the mold cavity which had been preheated to 150° C., and after closing the mold, a pressure of 15 MPa was applied and this state was retained for 120 seconds with the pressure applied. The mold was then opened to obtain a plate molded article having a length of 300 mm, a width of 300 mm, and a thickness of 1.1 mm. An integrally molded article was obtained by repeating the subsequent procedure of Example 31. The resulting integrally molded article had the properties shown in Table 8.

TABLE 1

|  |  | Resin sheet A | Resin sheet B | Resin sheet C | Resin sheet D | Resin sheet E | Resin sheet F |
|---|---|---|---|---|---|---|---|
| Type | — | Polypropylene | Nylon 6 | Nylon 66 | Polycarbonate | Polyphenylene sulfide | Modified polyphenylene ether |
| Weight per unit area | g/m$^2$ | 100 | 124 | 126 | 132 | 67 | 100 |
| Melting point | ° C. | 165 | 225 | 265 | — | 280 | — |
| Softening point | ° C. | — | — | — | 150 | — | 138 |
| Decomposition starting temperature | ° C. | 298 | 338 | 375 | 424 | 463 | 300 |
| Usable lowest temperature (TA1, TB1) | ° C. | 165 | 225 | 265 | 250 | 280 | 270 |
| Usable highest temperature (TA2, TB2) | ° C. | 248 | 288 | 325 | 374 | 413 | 310 |

TABLE 2-1

|  |  | Reinforcing fiber nonwoven fabric A | Reinforcing fiber nonwoven fabric B | Reinforcing fiber nonwoven fabric C | Reinforcing fiber nonwoven fabric D | Reinforcing fiber woven fabric E |
|---|---|---|---|---|---|---|
| Mat morphology | — | Wet web | Wet web | Wet web | Chopped strand mat | Woven fabric substrate |
|  |  | Nonwoven fabric | Nonwoven fabric | Nonwoven fabric | Nonwoven fabric | Not-nonwoven fabric |
| Dispersion state of reinforcing fiber | — | Monofilament | Monofilament | Monofilament | Strand (12K) | Strand |
| Fiber type | — | CF | CF | CF | CF | CF |
| Fiber length (Ln) | mm | 6 | 6 | 6 | 25 | Continuous fiber |
| Weight per unit area | g/m$^2$ | 100 | 200 | 50 | 200 | 200 |
| Reinforcing fiber volume ratio (Vfm) | vol % | 8.7 | 9.2 | 6.5 | 32 | 42 |
| Weight fraction of fine size strand | wt % | 100 | 100 | 100 | 3 | 0 |
| Fiber dispersion | % | 97 | 97 | 97 | — | — |
| Two-dimensional oriented angle | ° | 44 | 44 | 44 | — | — |

TABLE 2-2

|  |  | Reinforcing fiber nonwoven fabric F | Reinforcing fiber nonwoven fabric G | Reinforcing fiber nonwoven fabric H | Reinforcing fiber nonwoven fabric I | Reinforcing fiber woven fabric J | Reinforcing fiber nonwoven fabric K |
|---|---|---|---|---|---|---|---|
| Mat morphology | — | Dry web | Wet web | Wet web | Wet web | UD sheet substrate | Wet web |
| Dispersion state of reinforcing fiber | — | Nonwoven fabric Substantially monofilament | Nonwoven fabric Mono-filament | Nonwoven fabric Mono-filament | Nonwoven fabric Strand (0.5K-3K) | Not-nonwoven fabric Strand | Nonwoven fabric Mono-filament |
| Fiber type | — | CF | CF | CF | CF | CF | CF |
| Fiber length (Ln) | mm | 3.7 | 4.1 | 7.8 | 14.2 | Continuous fiber | 2.4 |
| Unit weight of the mat | g/m² | 100 | 100 | 100 | 150 | 115 | 100 |
| Reinforcing fiber volume ratio (Vfm) | vol % | 11 | 8.7 | 6.8 | 15 | 44 | 8 |
| Weight fraction of fine size strand | wt % | 62 | 100 | 100 | 21 | 0 | 100 |
| Fiber dispersion | % | — | 93 | 85 | — | — | 97 |
| Two-dimensional oriented angle | ° | — | 40 | 36 | — | — | 44 |

TABLE 3-1

|  |  |  | Example 1 | Example 2 | Example 3 | Example 4 | Example 5 | Example 6 | Example 7 | Example 8 | Example 9 | Example 10 |
|---|---|---|---|---|---|---|---|---|---|---|---|---|
| First member | Reinforcing fiber nonwoven fabric (RFNF) or reinforcing fiber woven fabric | — | RFNF A | RFNF A | RFNF A | RFNF A | RFNF A | RFNF A | RFNF B | RFNF C | RFNF D | RFNF B |
|  | Thermoplastic resin | — | Resin sheet A | Resin sheet B | Resin sheet C | Resin sheet D | Resin sheet E | Resin sheet F | Resin sheet A | Resin sheet B | Resin sheet B | Resin sheet B |
|  | Reinforcing fiber volume ratio in the area where reinforcing fibers are exposed (Vfm1) | vol % | 13.0 | 13.0 | 13.0 | 13.0 | 13.0 | 13.0 | 10.0 | 15.0 | 13.0 | 60.0 |
|  | Anti-plane angle (θz) | ° | 5.6 | 5.6 | 5.6 | 5.6 | 5.6 | 5.6 | 6.0 | 12.0 | 3.0 | 20.0 |
| Member to be joined (Second member) |  | — | PP compound | PP compound | PP compound | PP compound | PP compound | PP compound | PP compound | GMT | PP compound | PP compound |
| Integrating means |  | — | Insert molding | Insert molding | Insert molding | Insert molding | Insert molding | Insert molding | Insert molding | Stamping molding | Insert molding | Insert molding |
| Joining strength (τ2) |  | MPa | 18 | 19 | 19 | 17 | 16 | 19 | 19 | 16 | 5 | 8 |
| Maximum height (Ry) |  | μM | 150 | 131 | 91 | 55 | 55 | 80 | 150 | 150 | 21 | 21 |
| Average roughness (Rz) |  | μm | 91 | 79 | 54 | 35 | 32 | 54 | 91 | 91 | 15 | 15 |
| Anti-plane angle (θz) at the joining cross section of the integrally molded article |  | ° | 5.6 | 5.6 | 5.6 | 5.1 | 5.0 | 5.6 | 6.0 | 8.0 | 6.0 | 6.0 |

TABLE 3-2

|  |  | Example 11 | Example 12 | Example 13 | Example 14 | Example 15 | Example 16 | Example 17 | Example 18 | Example 19 |
|---|---|---|---|---|---|---|---|---|---|---|
| Reinforcing fiber nonwoven fabric (RFNF) or reinforcing fiber woven fabric | — | RFNF F | RFNF K | RFNF G | RFNF H | RFNF I | RFNF G | RFNF G | RFNF G | RFNF G |
| Thermoplastic resin (A) | — | Resin sheet A | Resin sheet A | Resin sheet A | Resin sheet A | Resin sheet A | Resin sheet A | Resin sheet A | Resin sheet C | Resin sheet D |
| Thermoplastic resin (B) | — | Resin sheet B | Resin sheet B | Resin sheet B | Resin sheet B | Resin sheet B | Resin sheet B | Resin sheet C | Resin sheet E | Resin sheet E |
| Impregnation temperature | °C. | 230 | 230 | 230 | 230 | 230 | 230 | 220/270 | 285 | 300 |
| Impregnation pressure | MPa | 3 | 3 | 3 | 3 | 3 | 3 | 3 | 3 | 3 |
| Fiber content by volume (Vfs) | vol % | 20 | 20 | 20 | 20 | 42 | 20 | 20 | 20 | 20 |
| Anti-plane angle (θz) | ° | 4.0 | 5.6 | 6.4 | 8.0 | 3.3 | 6.4 | 6.4 | 6.4 | 6.4 |
| Maximum height (Ry) | μm | 91 | 131 | 156 | 183 | 72 | 263 | 150 | 145 | 149 |
| Average roughness (Rz) | μm | 54 | 79 | 93 | 110 | 43 | 157 | 91 | 80 | 89 |
| Percentage of unimpregnated area (B) | % | 0 | 0 | 0 | 0 | 5 | 0 | 0 | 0 | 0 |

TABLE 4-1

|  |  |  | Comp. Example 1 | Comp. Example 2 |
|---|---|---|---|---|
| First member | Reinforcing fiber nonwoven fabric or reinforcing fiber woven fabric | — | Reinforcing fiber woven fabric E | Reinforcing fiber nonwoven fabric A |
|  | Thermoplastic resin | — | Resin sheet B | Resin sheet B |
|  | Reinforcing fiber volume ratio in the area where reinforcing fibers are exposed (Vfml) | vol % | 13.0 | 0.0 |
|  | Anti-plane angle (θz) | ° | 1.2 | 5.6 |
| Member to be joined (Second member) |  | — | PP compound | PP compound |
| Integrating means |  | — | Insert molding | Insert molding |
| Joining strength (τ2) |  | MPa | 2 | Peeling |
| Maximum height (Ry) |  | μm | 150 | Not measurable |
| Average roughness (Rz) |  | μm | 91 | Not measurable |
| Anti-plane angle (θz) at the joining cross section of the integrally molded article |  | ° | 1.2 | 5.6 |

TABLE 4-2

|  |  | Comp. Example 3 | Comp. Example 4 | Comp. Example 5 | Comp. Example 6 | Comp. Example 7 | Comp. Example 8 |
|---|---|---|---|---|---|---|---|
| Reinforcing fiber nonwoven fabric or reinforcing fiber woven fabric | — | Reinforcing fiber woven fabric J | Reinforcing fiber woven fabric J | Reinforcing fiber woven fabric E | Reinforcing fiber woven fabric E | Reinforcing fiber nonwoven fabric D | Reinforcing fiber nonwoven fabric G |
| Thermoplastic resin (A) | — | Resin sheet A | Resin sheet A | Resin sheet A | Resin sheet A | Resin sheet A | Resin sheet A |
| Thermoplastic resin (B) | — | Resin sheet B | Resin sheet B | Resin sheet B | Resin sheet B | Resin sheet B | Resin sheet B |
| Impregnation temperature | °C. | 230 | 230 | 230 | 230 | 230 | 200 |
| Impregnation pressure | MPa | 3 | 10 | 3 | 10 | 3 | 3 |
| Fiber content by volume (Vfs) | vol % | 45 | 45 | 50 | 50 | 40 | 20 |
| Anti-plane angle (θz) | ° | 0.8 | 0.5 | 1.7 | 1.2 | 3.0 | 6.4 |
| Maximum height (Ry) | μm | Not measurable | Not measurable | Not measurable | Not measurable | Not measurable | 21 |
| Average roughness (Rz) | μm | ↑ | ↑ | ↑ | ↑ | ↑ | 15 |
| Percentage of unimpregnated area (B) | % | 55 | 42 | 50 | 42 | 20 | 0 |

TABLE 5

|  |  | Ref. Ex. 1 | Ref. Ex. 2 | Ref. Ex. 3 | Ref. Ex. 4 | Ref. Ex. 5 | Ref. Ex. 6 | Ref. Ex. 7 | Ref. Ex. 8 | Ref. Ex. 9 | Ref. Ex. 10 | Ref. Ex. 11 | Ref. Ex. 12 | Ref. Ex. 13 | Ref. Ex. 14 |
|---|---|---|---|---|---|---|---|---|---|---|---|---|---|---|---|
| Reinforcing fiber mat | — | RFNF G | RFNF G | RFNF G | RFNF G | RFNF G | RFNF F | RFNF F | RFNF K | RFNF K | RFNF H | RFNF H | RFNF I | RFNF I | GMT |
| Thermoplastic resin | — | Resin sheet A | Resin sheet B | Resin sheet C | Resin sheet D | Resin sheet E | Resin sheet A | Resin sheet B | Resin sheet A | Resin sheet B | Resin sheet A | Resin sheet B | Resin sheet A | Resin sheet B | |
| Number of reinforcing fiber mat | ply | 2 | 2 | 2 | 2 | 2 | 2 | 2 | 2 | 2 | 2 | 2 | 2 | 2 | — |
| Number of resin sheet | ply | 2 | 2 | 2 | 2 | 4 | 2 | 2 | 2 | 2 | 2 | 2 | 2 | 2 | — |
| Mold temp. | °C. | 200 | 230 | 280 | 280 | 300 | 200 | 230 | 200 | 230 | 200 | 230 | 200 | 230 | 200 |
| Thickness of molding substrate | mm | 0.55 | 0.55 | 0.55 | 0.55 | 0.55 | 0.55 | 0.55 | 0.55 | 0.55 | 0.55 | 0.55 | 0.55 | 0.55 | 1.6 |
| Fiber content by vol. (Vf) | vol % | 20 | 20 | 20 | 20 | 20 | 20 | 20 | 20 | 20 | 20 | 20 | 40 | 40 | 21 |

RFNF: Reinforcing fiber nonwoven fabric

TABLE 6-1

|  |  | Ex. 20 | Ex. 21 | Ex. 22 | Ex. 23 | Ex. 24 | Ex. 25 | Ex. 26 | Ex. 27 | Ex. 28 |
|---|---|---|---|---|---|---|---|---|---|---|
| Laminating unit (X) | — | Ref. Ex. 6 | Ref. Ex. 8 | Ref. Ex. 1 | Ref. Ex. 10 | Ref. Ex. 12 | Ref. Ex. 1 | Ref. Ex. 3 | Ref. Ex. 4 | Ref. Ex. 2 |
| Laminating unit (Y) | — | Ref. Ex. 7 | Ref. Ex. 9 | Ref Ex. 2 | Ref. Ex. 11 | Ref. Ex. 13 | Ref. Ex. 2 | Ref. Ex. 5 | Ref. Ex. 5 | Resin sheet A |
| Fiber-reinforced resin sheet (Z) | — | Ex. 11 | Ex. 12 | Ex. 13 | Ex. 14 | Ex. 15 | Ex. 16 | Ex. 18 | Ex. 19 | Ex. 12 |
| Laminate constitution | — | X/Z/Y | X/Z/Y | X/Z/Y | X/Z/Y | X/Z/Y | X/Z/Y | X/Z/Y | X/Z/Y | X/Z/Y/Z/X |
| Preheating temperature | °C. | 230 | 230 | 230 | 230 | 230 | 230 | 300 | 300 | 230 |
| Molding pressure | MPa | 15 | 15 | 15 | 15 | 15 | 15 | 15 | 15 | 1 |
| Maximum height (Ry) | mm | 73 | 105 | 124 | 146 | 57 | 210 | 116 | 119 | 81 |
| Average roughness (Rz) | mm | 43 | 63 | 74 | 88 | 34 | 125 | 64 | 71 | 48 |
| Shear strength (τ1) | MPa | 25 | 27 | 28 | 28 | 23 | 29 | 48 | 37 | — |
| CV1 | % | 1.3 | 1.2 | 1.2 | 1.2 | 1.5 | 1.1 | 1.2 | 1.2 | — |

TABLE 6-2

|  |  | Comp. Ex. 9 | Comp. Ex. 10 | Comp. Ex. 11 | Comp. Ex. 12 | Comp. Ex. 13 | Comp. Ex. 14 | Comp. Ex. 15 | Comp. Ex. 16 | Comp. Ex. 17 |
|---|---|---|---|---|---|---|---|---|---|---|
| Laminating unit (X) | — | Ref. Ex. 6 | Ref. Ex. 8 | Ref. Ex. 1 | Ref. Ex. 10 | Ref. Ex. 12 | Ref. Ex. 3 | Ref. Ex. 4 | Ref. Ex. 1 | Ref. Ex. 1 |
| Laminating unit (Y) | — | Ref. Ex. 7 | Ref. Ex. 9 | Ref. Ex. 2 | Ref. Ex. 11 | Ref. Ex. 13 | Ref. Ex. 5 | Ref. Ex. 5 | — | Ref. Ex. 2 |
| Fiber-reinforced resin sheet (Z) | — | — | — | — | — | — | — | — | — | Comp. Ex. 8 |
| Laminate constitution | — | X/Y | X/Y | X/Y | X/Y | X/Y | X/Y | X/Y | X | X/Z/Y |
| Preheating temperature | °C. | 230 | 230 | 230 | 230 | 230 | 300 | 300 | 230 | 230 |
| Molding pressure | MPa | 15 | 15 | 15 | 15 | 15 | 15 | 15 | 15 | 15 |

TABLE 6-2-continued

|  |  | Comp. Ex. 9 | Comp. Ex. 10 | Comp. Ex. 11 | Comp. Ex. 12 | Comp. Ex. 13 | Comp. Ex. 14 | Comp. Ex. 15 | Comp. Ex. 16 | Comp. Ex. 17 |
|---|---|---|---|---|---|---|---|---|---|---|
| Maximum height (Ry) | mm | 27 | 32 | 30 | 53 | 20 | 28 | 29 | — | 19 |
| Average roughness (Rz) | mm | 17 | 18 | 21 | 24 | 11 | 17 | 20 | — | 13 |
| Shear strength (τ1) | MPa | 12 | 14 | 14 | 15 | 11 | 11 | 11 | 29 | 11 |
| CV1 | % | 17 | 15 | 14 | 30 | 21 | 16 | 14 | 0.7 | 14 |

TABLE 7

|  |  | Example 29 | Example 30 | Comp. Example 18 | Comp. Example 19 | Comp. Example 20 |
|---|---|---|---|---|---|---|
| first member |  | Example 13 Ref. Example 2 | Example 17 | Ref. Example 2 | Ref. Example 3 | Ref. Example 1 |
| Second member |  | PP compound | PP compound | PP compound | PP compound | PP compound |
| Integrating means |  | Insert injection molding | Insert injection molding | Insert injection molding | Insert injection molding | Insert injection molding |
| Cylinder temperature | °C. | 200 | 200 | 200 | 200 | 200 |
| Shear strength (τ2) | MPa | 19 | 18 | Peeling | Peeling | 19 |
| CV2 | % | 3 | 4 | — | — | 0.5 |

TABLE 8

|  |  | Example 31 | Example 32 | Comp. Example 21 | Comp. Example 22 |
|---|---|---|---|---|---|
| first member |  | Example 13 Ref. Example 2 | Example 17 | Ref. Example 2 | Ref. Example 3 |
| Second member |  | GMT | GMT | GMT | GMT |
| Integrating means |  | Stamping molding | Stamping molding | Stamping molding | Stamping molding |
|  | °C. | 200 | 200 | 200 | 200 |
| Molding pressure | MPa | 15 | 15 | 15 | 15 |
| Shear strength (τ2) | MPa | 19 | 19 | 2 | 2 |
| CV2 | % | 3 | 4 | 3 | 3 |

In all of Examples 1 to 8, the volume ratio Vfm1 of the reinforcing fiber in the area where the reinforcing fibers are exposed was within the adequate range, and the fiber-reinforced resin sheets having various resin sheets impregnated on one side could be produced. In addition, the integrally molded articles produced by using such fiber-reinforced resin sheets exhibited sufficient joining strength due to the exposed reinforcing fiber of the reinforcing fiber nonwoven fabric, and the resulting integrally molded article was adapted for practical use. This is the result of the fact that the voids in the reinforcing fiber nonwoven fabric facilitated complicated impregnation of different resins to promote growth of the maximum height Ry and the average roughness Rz in the interface layer to a sufficient size, thereby enabling the formation of an ideal interface layer. In addition, the anti-plane angle θz of the reinforcing fiber was in the preferable range, and a good interface layer could be formed with the thermoplastic resin of the second member. Of the Examples, the maximum height Ry and the average roughness Rz in the interface layer could be allowed to grow to a more preferable size, and a higher joining strength could be realized in Examples 1, 2, 7, and 8 since the integration molding could be conducted in the adequate temperature range within the overlapping of the usable temperature of the thermoplastic resin of the second member to be joined and the thermoplastic resin of the reinforcing fiber sheet. With regard to Examples 9 and 10, the maximum height (Ry) and the average roughness (Rz) were low at the joining surface with the article to be joined, and accordingly, the joining strength was insufficient while the integrally molded article could retain its shape since the reinforcing fiber was present in bundle form in Example 9 and the volume ratio Vfm1 of the reinforcing fiber in the area where the reinforcing fibers are exposed was too high in Example 10, and impregnation in the reinforcing fiber of the thermoplastic resin constituting the second member was low compared to Example 2.

In the case of Examples 3 to 6, the concave/convex degree of the interface layer was less significant due to the large difference in the usable temperatures of the thermoplastic resins constituting the first member and the second member. However, the joining strength of the integrally molded article was at a practical level by the reinforcement effect of the exposed reinforcing fiber nonwoven fabric.

In contrast, the joining strength was insufficient in the case of Comparative Example 1 since the reinforcing fiber was in continuous bundle form and impregnation of the thermoplastic resin constituting the second member was insufficient. In the case of Comparative Example 3, joining strength of the integrally molded article was insufficient due to the absence of the anchoring by the reinforcing fiber due to the absence of the reinforcing fiber despite use of the reinforcing fiber nonwoven fabric.

In Examples 11 to 19, the fiber-reinforced resin sheets could be prepared with no or little residual unimpregnated area due to the use of the nonwoven fabric having a low volume ratio Vfm of the reinforcing fiber with high function as the impregnation medium. In addition, the maximum height Ry and the average roughness Rz in the interface layer could grow to a sufficient size because the voids in the nonwoven fabric facilitated complicated impregnation of the different resins. Of these Examples, in Examples 12, 13, and 14 using the reinforcing fiber nonwoven fabrics K, G, and H, the interface layer was remarkably ideal and the anti-plane angle θz of the reinforcing fiber was also favorable. On the other hand, the volume ratio Vfm of the reinforcing fiber in the nonwoven fabric was high in all of Comparative Examples 3 to 7, and the thermoplastic resin could not be sufficiently impregnated and many areas were left unimpregnated. In the case of Comparative Examples 4 and 6 where the resin impregnation at a pressure higher than normal pressure was attempted, alignment of the reinforcing fiber was disturbed while the problem of insufficient impregnation remained unsolved. Although Comparative Example 7 was the only Comparative Example using the nonwoven fabric in these Comparative Examples, the volume ratio Vfm of the reinforcing fiber in the nonwoven fabric could not be sufficiently reduced due to the large strand size, and unimpregnated area remained in the strand. It is to be noted that the measurement could not be conducted in Comparative Examples 3 to 7 since the interface layer was not formed due to the insufficient impregnation. In addition, in Comparative Example 8, the thermoplastic resin (B) was not sufficiently melted and the maximum height Ry and the average roughness Rz in the interface layer could not be formed in sufficient size since the impregnation temperature was lower than TB1 and the thermoplastic resin (B) was not sufficiently melted.

Examples 20 to 28 have inherited the interface layer of the fiber-reinforced resin sheets of Examples 11 to 19 as described above in the molded article. Because of this, Examples 20 to 28 exhibited the shear strength τ1 (an index of the joining state at the interface of different resins) comparable to that of the shear strength T1 of the molded article of Comparative Example 15 attained by the use of single resin. The distribution (CV1) of the strength was also small, and excellent performance was confirmed for the reliability. In the case of Example 24 prepared by using Example 15, the shear strength τ1 was slightly inferior due to the relatively inferior reinforcement efficiency of the reinforcing fiber at the interface layer. However, the shear strength value was near the shear strength of the matrix resin, and it was regarded that the fracture was not caused by the peeling at the interface of different resins. High shear strength was realized in Examples 26 and 27 despite use of the PPS resin with low adhesion property, and this demonstrated effectiveness of the anchoring structure at the interface. In Example 18, a sandwich structure of the core solely comprising the thermoplastic resin and the molding substrate of Reference Example 2 was prepared, and it was also confirmed for this case that the interface layer inherited from the fiber-reinforced resin sheets was certainly present between the core and the skin comprising different resins.

In Comparative Examples 9 to 15, the reinforcement fiber sheet is not inserted between the molding substrate comprising different resins, and sufficient anchoring structure was not formed in the interface layers in all of these Comparative Examples. Accordingly, the shear strength τ1 was as low as less than half of the Comparative Example 16. In the case of Comparative Example 12, the maximum height Ry was sufficient while the average roughness Rz was insufficient, and as a consequence, the shear strength T1 was inconsistent and the average was unfavorable. In Comparative Example 17, the fiber-reinforced resin sheet inserted was the one prepared in Comparative Example 8 wherein the size of the maximum height Ry and the average roughness Rz in the interface layer were insufficient, and this was also reflected in the molded article, and the anchoring structure was not formed. Accordingly, the shear strength τ1 was low.

In Examples 29 and 30, the production of the integrally molded articles by insert injection molding could be readily accomplished due to the joining surface provided by the fiber-reinforced resin sheet. In addition, since the first member had the surface comprising the resin which is the same as the material used for the injection molding, the adhesion at the joint was equivalent with that of Example 1, and the interface layer in the first member was not peeled in the breakage. In the case of Comparative Examples 18 and 19, the joining surface was not formed in the first member, and the first member was not at all joined with the second member resulting in the peeling of the test piece in the cut out.

The situation was similar in the case of Examples 31 and 32, and the production of the integrally molded articles by stamping molding could be readily accomplished with sufficient joint strength. In the case of Comparative Examples 21 and 22, the integrally molded article could be prepared with considerable difficulty. The integrally molded article, however, exhibited peeling at the joint even in the application of small load, and the integrally molded article was far below the practical level.

INDUSTRIAL APPLICABILITY

The fiber-reinforced resin sheet of the present invention or the integrally molded article produced by using such fiber-reinforced resin sheet of the present invention enables production of a hybrid of different resins with no particular limitation in the combination of the thermoplastic resin used. Accordingly, the fiber-reinforced resin sheet or the integrally molded article produced therefrom may be used in a wide variety of applications such as interior or exterior of automobiles, housing of electric or electronic equipment, structural material of a bicycle or other sport gear, interior of aircrafts, packages for transportation purpose, and the like.

EXPLANATION OF REFERENCE NUMERALS 1, 4, 8, 21, 28, 29, 30, 51 fiber-reinforced resin sheet
2, 5, 9, 10, 11, 12, 13, 14, 15, 16 reinforcing fiber (single filament)
3 the layer impregnated with the thermoplastic resin (A) in the fiber-reinforced resin sheet
6 the layer impregnated with the thermoplastic resin (B) in the fiber-reinforced resin sheet
7 the layer impregnated with the thermoplastic resin (A) in the fiber-reinforced resin sheet
17 two-dimensional contact angle, two-dimensional oriented angle
18, 22, 23 molded article
19, 24, 25 the layer wherein the thermoplastic resin (A) is the substrate
20, 26, 27 the layer wherein the thermoplastic resin (B) is the substrate
31 thermoplastic resin (A)
32 thermoplastic resin (B)
33 interface layer of fiber-reinforced resin sheet
34 concave part with maximum depth in the interface layer
35 convex part with maximum height in the interface layer
36 concave part with minimum depth in the interface layer
37 convex part with minimum height in the interface layer
38 the test piece used in the evaluation of the shear strength τ1
40 the test piece used in the evaluation of the shear strength τ2
39, 41 notch 42, 45 integrally molded article
43, 46 first member
44, 47 second member
48, 52, 56 preform
49, 57 laminating unit (X)
50, 54, 58 laminating unit (Y)

The invention claimed is:

1. A fiber-reinforced resin sheet comprising a nonwoven fabric made of reinforcing fibers having a thermoplastic resin (A) impregnated on a first side in the nonwoven fabric thickness direction,
   wherein the reinforcing fiber in the sheet has an anti-plane angle θz of at least 5°; and
   wherein the fiber-reinforced resin sheet satisfies either one of the following conditions (I) and (II):
   (I) the nonwoven fabric has an area wherein the reinforcing fibers constituting the nonwoven fabric are exposed on a second side opposite to the first side in the thickness direction of the nonwoven fabric, wherein the area where the reinforcing fibers are exposed has a reinforcing fiber volume ratio Vfm of up to 20% by volume; or
   (II) the nonwoven fabric has a thermoplastic resin (B) impregnated on the second side of the nonwoven fabric, and the nonwoven fabric has a reinforcing fiber volume ratio Vfm of up to 20% by volume, wherein the thermoplastic resin (A) and the thermoplastic resin (B) form an interface layer in the sheet, and the interface layer has a concave-convex shape with a maximum height Ry of at least 50 μm and an average roughness Rz of at least 30 μm.

2. The fiber-reinforced resin sheet according to claim 1, wherein the resin sheet satisfies the condition (I).

3. The fiber-reinforced resin sheet according to claim 1, wherein the resin sheet satisfies the condition (II).

4. The fiber-reinforced resin sheet according to claim 1, wherein the thermoplastic resin (A) usable temperature range and the thermoplastic resin (B) usable temperature range overlap with each other over an overlapping temperature range of at least 5° C.

5. The fiber-reinforced resin sheet according to claim 1, wherein discontinuous reinforcing fibers are dispersed in a substantially monofilament state in the nonwoven fabric.

6. The fiber-reinforced resin sheet according to claim 1, wherein the reinforcing fiber constituting the nonwoven fabric is carbon fiber.

7. An integrally molded article comprising a first member constituted from the fiber-reinforced resin sheet according to claim 2 and a second member which is a different molded article comprising a thermoplastic resin (B) joined to the first member by impregnation of the thermoplastic resin (B) into the area where the reinforcing fibers are exposed in the fiber-reinforced resin sheet.

8. An integrally molded article comprising a first member which is the fiber-reinforced resin sheet according to claim 3; and a second member joined to the first member which is a different molded article.

9. An integrally molded article comprising: a first member which is a molded article containing the fiber-reinforced resin sheet according to claim 3; and a second member joined to the first member which is a different molded article.

10. The integrally molded article according to claim 7 wherein the thermoplastic resin (A) and the thermoplastic resin (B) forms an interface layer having a concave-convex shape with a maximum height Ry of at least 50 μm and an average roughness Rz of at least 30 μm.

11. A method for producing the integrally molded article according to claim 7 wherein the second member is a molded article prepared by injection molding, and the second member is joined to the first member by insert injection molding or outsert injection molding.

12. A method for producing the integrally molded article according to claim 7 wherein the second member is a molded article prepared by press molding, and the second member is joined to the first member by press molding.

13. The integrally molded article according to claim 7 wherein the article is used for automobile interior or exterior material, housing of electric or electronic equipment, structural member of a bicycle or sport equipment, aircraft interior finishing material, or transportation package.

14. The integrally molded article according to claim 8 wherein the thermoplastic resin (A) and the thermoplastic resin (B) forms an interface layer having a concave-convex shape with a maximum height Ry of at least 50 μm and an average roughness Rz of at least 30 μm.

15. A method for producing the integrally molded article according to claim 8 wherein the second member is a molded article prepared by injection molding, and the second member is joined to the first member by insert injection molding or outsert injection molding.

16. A method for producing the integrally molded article according to claim 8 wherein the second member is a molded article prepared by press molding, and the second member is joined to the first member by press molding.

17. The integrally molded article according to claim 8 wherein the article is used for automobile interior or exterior material, housing of electric or electronic equipment, structural member of a bicycle or sport equipment, aircraft interior finishing material, or transportation package.

* * * * *